United States Patent
Sakamoto et al.

(10) Patent No.: US 7,219,933 B2
(45) Date of Patent: May 22, 2007

(54) HOLLOW PRODUCT, FLUID PROCESSING SYSTEM AND JOINING METHOD OF HOLLOW MEMBERS

(75) Inventors: Tatsuya Sakamoto, Kasugai (JP); Seiji Ishizu, Toyota (JP); Kazushi Wakide, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/296,038

(22) PCT Filed: May 30, 2001

(86) PCT No.: PCT/IB01/00943

§ 371 (c)(1),
(2), (4) Date: Mar. 17, 2003

(87) PCT Pub. No.: WO01/92696

PCT Pub. Date: Dec. 6, 2001

(65) Prior Publication Data

US 2003/0173778 A1    Sep. 18, 2003

(30) Foreign Application Priority Data

Jun. 2, 2000    (JP)    ............................. 2000-165893

(51) Int. Cl.
 *F16L 13/02*    (2006.01)
 *B23K 20/12*    (2006.01)

(52) U.S. Cl. ............................... 285/288.1; 285/334.5; 228/112.1; 228/114.5

(58) Field of Classification Search ............ 285/286.1, 285/286.2, 288.1, 334.5, 405; 228/112.1, 228/113, 114.5, 15.1, 16
See application file for complete search history.

(56) References Cited

U.S. PATENT DOCUMENTS

| | | | | |
|---|---|---|---|---|
| 1,951,122 A | * | 3/1934 | Balze | 285/286.2 |
| 2,388,924 A | * | 11/1945 | Mercier | 60/322 |
| 2,966,372 A | * | 12/1960 | Phillips | 285/39 |
| 3,396,813 A | | 8/1968 | Hall | |
| 3,429,591 A | * | 2/1969 | Loyd et al. | 285/189 |
| 3,523,590 A | * | 8/1970 | Straw | 181/282 |
| 3,779,446 A | | 12/1973 | Lemelson | |
| 4,132,437 A | | 1/1979 | Green | |
| 4,211,589 A | * | 7/1980 | Fisher et al. | 156/73.5 |
| 4,445,265 A | * | 5/1984 | Olson et al. | 29/447 |
| 4,949,895 A | * | 8/1990 | Sugiyama et al. | 228/175 |
| 5,069,368 A | * | 12/1991 | Godard et al. | 222/321.9 |
| 5,154,340 A | | 10/1992 | Peacock | |
| 5,824,179 A | * | 10/1998 | Greig | 156/274.2 |
| 6,050,474 A | * | 4/2000 | Aota et al. | 228/112.1 |
| 6,250,037 B1 | * | 6/2001 | Ezumi et al. | 52/592.1 |
| 6,471,112 B2 | * | 10/2002 | Satou et al. | 228/112.1 |
| 6,517,116 B1 | * | 2/2003 | Cassaro et al. | 285/189 |
| 6,581,819 B1 | * | 6/2003 | Aota et al. | 228/112.1 |
| 2002/0121259 A1 | * | 9/2002 | Mizutani | 123/188.8 |

(Continued)

FOREIGN PATENT DOCUMENTS

DE    3903551 A1  *  8/1989

(Continued)

OTHER PUBLICATIONS

Japanese Office Action and translation thereof.

*Primary Examiner*—James M. Hewitt
(74) *Attorney, Agent, or Firm*—Kenyon & Kenyon LLP

(57) ABSTRACT

A connecting portion (10c) of a container (10) of a catalyst converter is formed with a joining portion (15) to be joined to a joining portion (16) of a flange member (11) by spinning working, and the joining portion (15) formed by the spinning working is joined to the joining portion (16) of the flange member (11) by friction welding. One of the connecting portion (10c) of the container of the catalyst converter and the flange member (11) is extended so as to be disposed radially inward of the joining portions (15) and (16).

15 Claims, 19 Drawing Sheets

FOREIGN PATENT DOCUMENTS

| | | |
|---|---|---|
| DE | 299 05 633 | 9/2000 |
| EP | 0 259 010 | 3/1988 |
| EP | 0 972 915 | 1/2000 |
| FR | 2 564 536 | 11/1985 |
| GB | 747 829 | 4/1956 |
| JP | A 58-206327 | 12/1983 |
| JP | 63-132790 | 6/1988 |
| JP | A 7-155879 | 6/1995 |
| JP | A 8-39178 | 2/1996 |
| JP | A 8-117877 | 5/1996 |
| JP | 09234377 | 9/1997 |
| JP | 09242540 | 9/1997 |
| JP | A 9-276961 | 10/1997 |
| JP | 10029077 | 2/1998 |
| JP | 2001355436 A * | 12/2001 |
| JP | 2002004847 A * | 1/2002 |
| JP | 2002161741 A * | 6/2002 |
| WO | WO9961764 | 12/1999 |
| WO | WO0016924 | 3/2000 |

* cited by examiner

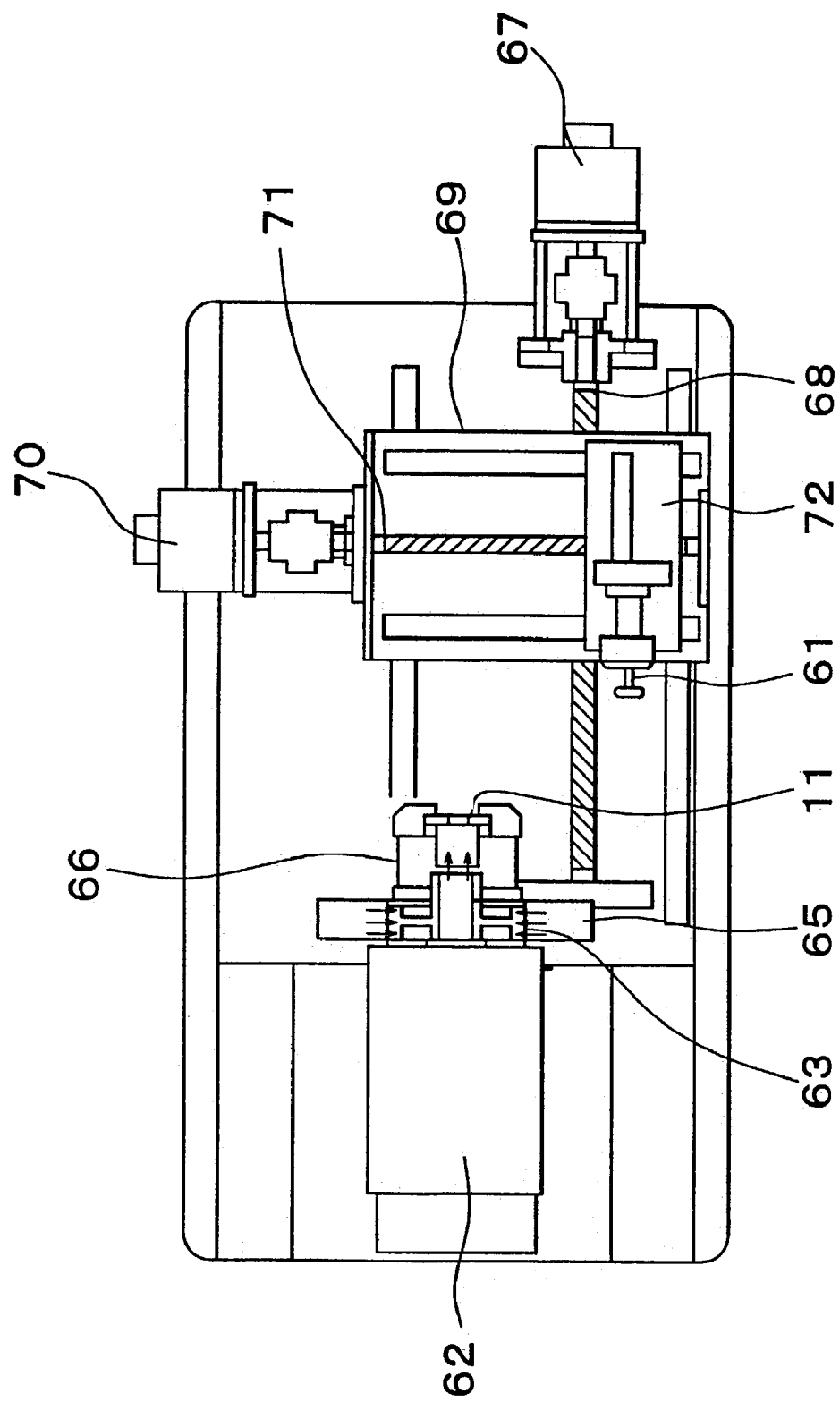

F I G. 5A
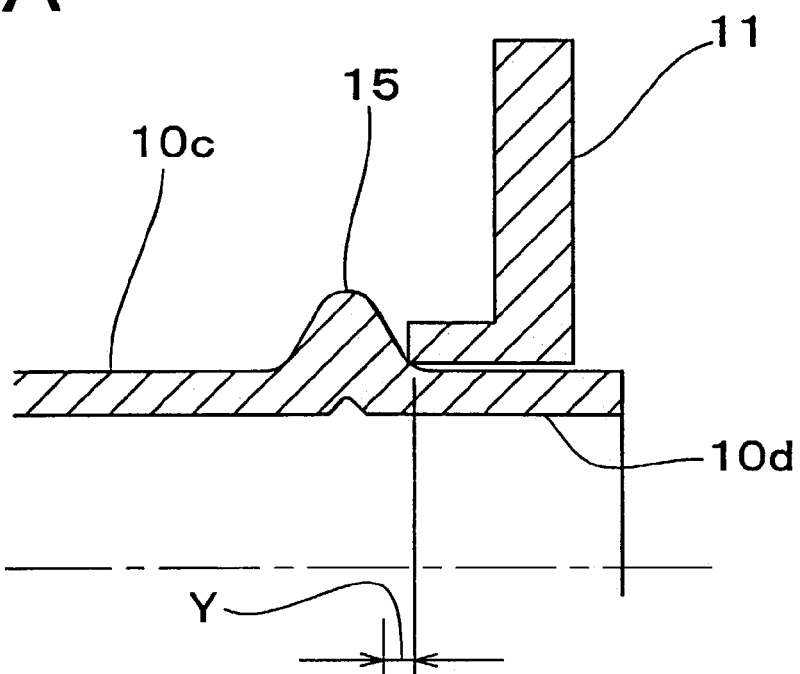
F I G. 5B
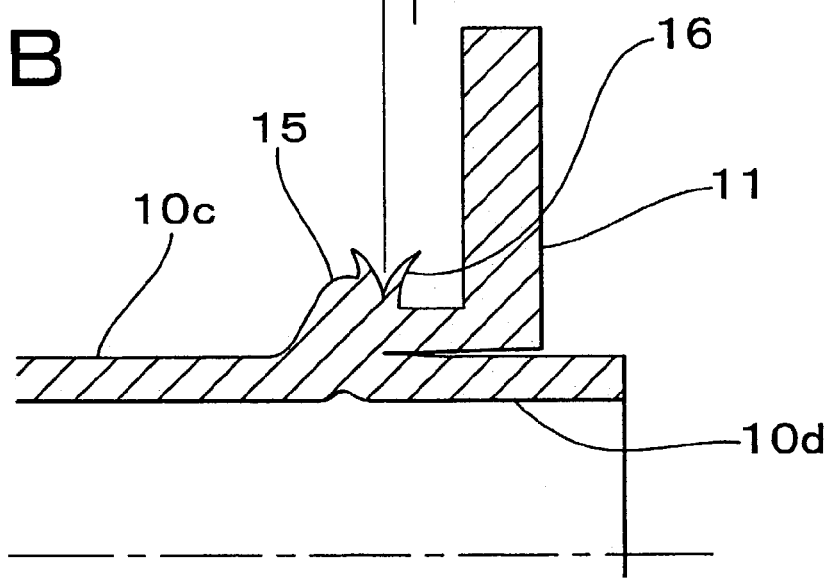

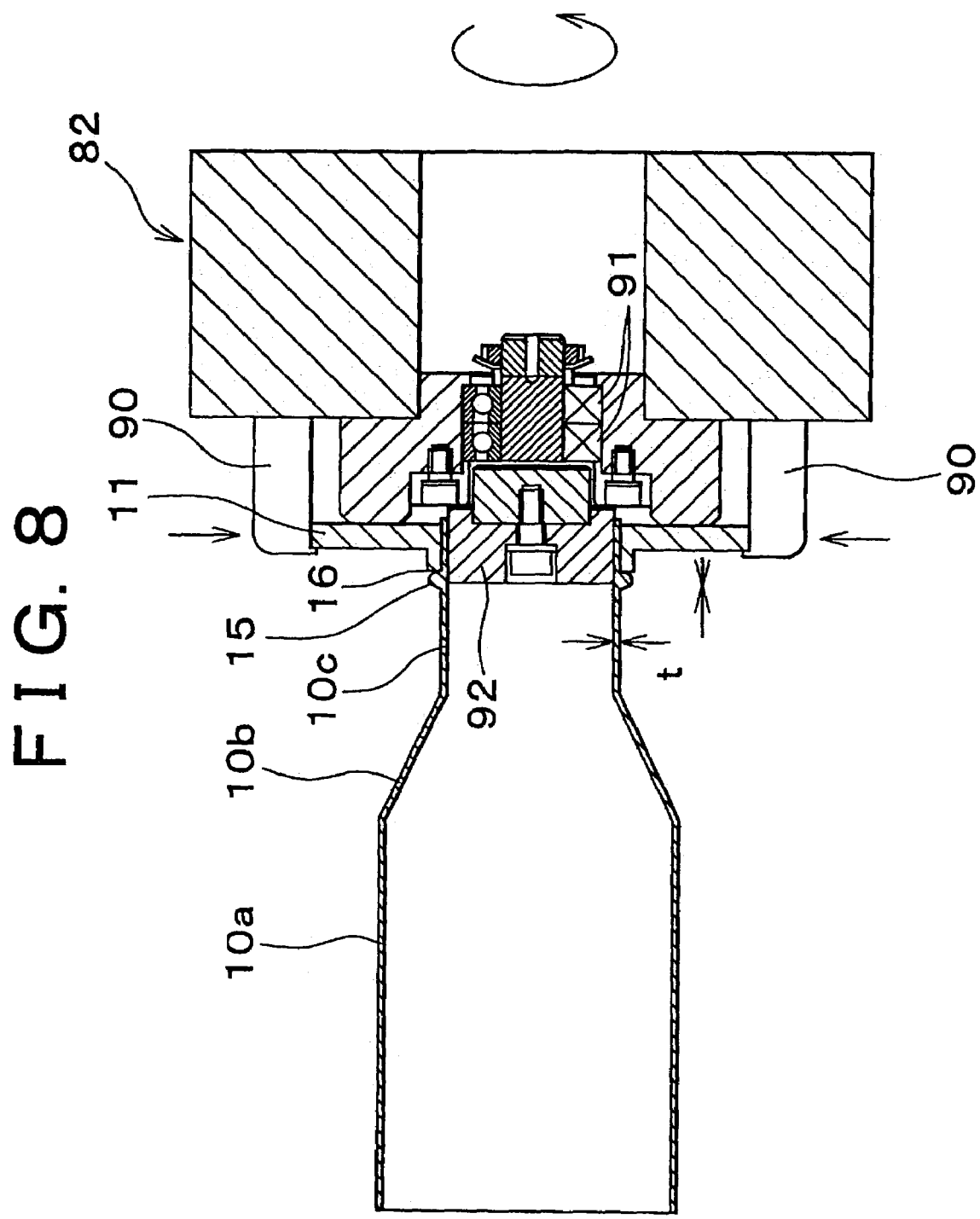

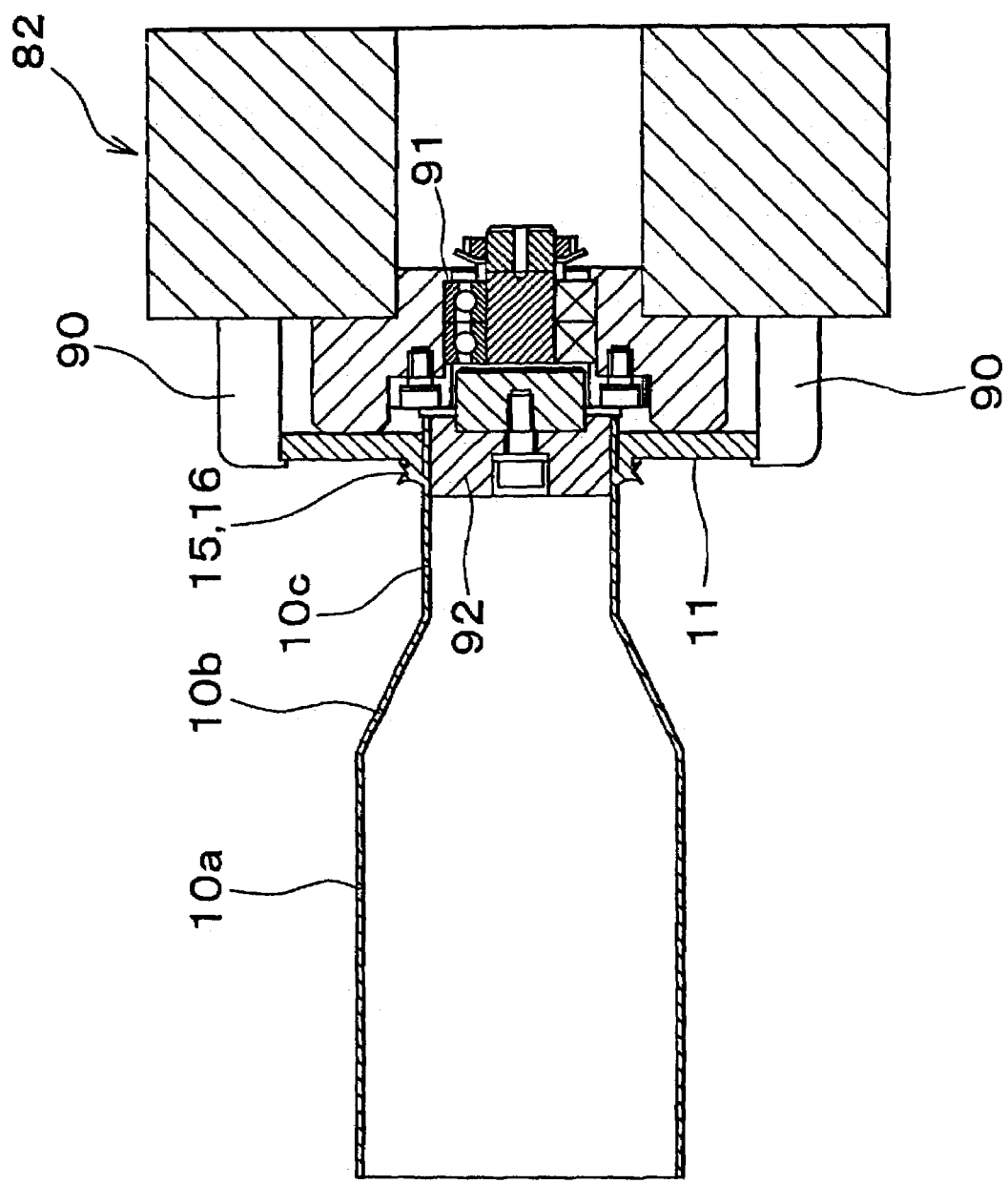

HOLLOW PRODUCT, FLUID PROCESSING SYSTEM AND JOINING METHOD OF HOLLOW MEMBERS

FIELD OF THE INVENTION

The invention relates to a hollow product, a fluid processing system and a joining method of hollow members, and more particularly, to a hollow product comprising joined hollow members for allowing fluid to flow therein, a fluid processing system comprising joined hollow members, at least one of the hollow members having a processing function portion which carried out a predetermined processing with respect to fluid flowing therein. The invention also relates to a joining method for joining hollow members to each other.

BACKGROUND OF THE INVENTION

As a hollow product for allowing fluid to flow therein, an exhaust system for flowing and discharging exhaust gas, or the fluid, is connected to a combustion engine such as an internal combustion engine for a vehicle. As shown in FIG. 19, the exhaust system comprises hollow members such as an exhaust manifold 1, a catalyst converter 2, a pipe 3, a pre-muffler 4 and a main muffler 5. The catalyst converter 2 purifies the exhaust gas discharged from a combustion engine and which flows from the exhaust manifold by causing chemical reactions such as oxidation and reduction of the exhaust gas to take place. The pre-muffler 4 and the main muffler 5 bring high-pressure exhaust gas flowing from the catalyst converter 2 and the pipe 3 close to atmospheric pressure for reducing noise.

The hollow members such as the exhaust manifold 1, the catalyst converter 2, the pipe 3, the pre-muffler 4 and the main muffler 5 are detachably connected to an adjacent hollow members so that the hollow member can easily be replaced by another member when it is damaged. Therefore, the hollow members are provided at ends of containers or connection pipes with flange members capable of being fastened by means of bolts, and thus the hollow members are formed into one unit.

FIG. 20 shows related art for joining a flange member 11' as one hollow member to the other hollow member 10' such as a connection pipe. In this related art, a plate is formed with a hole to form the hollow flange member 11', the hollow member 10' such as the connection pipe is inserted through the flange member 11', and the two members are joined to each other by cladding welding.

For example, Japanese Patent Applications Laid-open No. 9-234877, No. 10-29077, No. 9-242540 and No. 63-132790 disclose a technique for joining ends of pipe-like hollow members in their longitudinal direction by friction welding.

This Japanese Patent Application Laid-open No. 63-132790 discloses a manufacturing method for a rotation shaft wherein an end surface of a pipe-like rotation shaft constituent member is friction welded to an end surface of another pipe-like rotation shaft constituent member so as to form a rotation shaft body. In this method, the rotation shaft constituent members are friction welded to each other in a state where a core member for preventing generation of burrs is inserted into the pipes of the rotation shaft constituent members, and. This publication describes that this core member is formed such that its outer diameter is substantially the same as an inner diameter of the rotation shaft constituent member. The publication also describes that the core member is inserted into the pipe of the rotation shaft constituent member which is held in its stationary state before the friction welding operation.

Japanese Patent Publication No. 2957163 discloses an exhaust system part of a double heat insulation structure comprising an inner pipe whose opposite ends are reduced in diameter in a tapered state and an outer pipe whose opposite ends are reduced in diameter in a tapered state, wherein the inner and outer pipes are disposed with a gap interposed therebetween. This publication also discloses a manufacturing method of the exhaust system part. In this publication, there are described that "tip ends of both tapered diameter-reduced portions of the outer pipe are extended by a spinning roller to push the tip ends against an outer peripheral surface of a connecting portion of the inner pipe for plastically deforming the tip ends, and the extended connecting portion and a connecting portion of the inner pipe are connected to each other, thereby integrally forming the inner and outer pipes," or that "a shock absorbing member is interposed between steps formed on connecting portions of the inner and outer pipes by drawing, thereby preventing the inner and outer pipes from coming into contact with each other by oscillation, the inner and outer pipes are allowed to slide relatively in their axial direction so that a stress caused by difference in temperature, and therefore in coefficient of thermal expansion, between the inner and outer pipes is moderated to enhance the durability" (paragraph numbers are 0024, 0029 and 0030).

Among the above conventional techniques, the one shown in FIG. 20 for cladding welding the plate materials constituting the flange members and the pipe inserted into the holes of the flange members has a problem that a weight of the hollow product is increased due to the cladding by welding. This problem is serious especially in the case of an exhaust system of a moving body having an internal combustion engine such as an automobile. Further, in this related art, it is necessary to take protective measures such as a cover for protecting the hollow member and a welding apparatus from spatter generated at the time of cladding by welding, and there is a problem that equipment cost is increased. Furthermore, in this related art, when the hollow product is used for allowing fluid to flow therein, in order to reliably secure the air-tightness against fluid flowing in the hollow product, it is necessary to continuously carry out the cladding by welding over the entire periphery, and there is a problem that joining quality by highly professional welding is required. Further, there is a problem that the quality of the joined hollow members is varied due to thermal effect by the welding.

Further, among the above conventional techniques, the one for joining the pipes by friction welding has a problem that the joining quality is unstable when end surfaces of relatively thin hollow members are joined. As shown in FIG. 21, in Japanese Patent Applications Laid-open No. 9-234877, No. 10-29077 and No. 9-242540, a burr is generated not only on outer sides of hollow members 30' and 31', but also on inner sides thereof due to the friction welding. When the hollow product is used for allowing the fluid therein to carry out a predetermined processing, since the burr generated on the inner side projecting therefrom becomes a flow resistance of the fluid deteriorating the flow efficiency, it is necessary to remove the burr. However, as described in Japanese Patent Application Laid-open No. 63-132790 also, it is difficult to remove the burr generated on the inner side. Therefore, in the related art for joining the pipes by friction welding, it was not possible to enhance the flow efficiency of fluid flowing in the hollow member. The core member in Japanese Patent Application Laid-open No. 63-132790 is merely inserted into the pipe of the rotation shaft constituent member, and there is no description concerning whether the core member is pulled out from the rotation shaft constituent member after the friction welding of the rotation shaft constituent members, or the core member is left therein.

Among the above conventional techniques, in Japanese Patent Publication No. 2957163, the connecting portion of the outer pipe is connected to the connecting portion of the inner pipe directly or through a shock absorbing member merely by drawing using the spinning roller. Therefore, there is a problem that the connection between the inner and outer pipes is weak.

SUMMARY OF THE INVENTION

The invention has been accomplished in view of the above problems, and it is an object of the invention to provide a light-weight hollow product in which hollow members are easily and reliably joined to each other without generating a burr on an inner side of the hollow product and fluid can flow in the hollow product efficiently. It is another object of the invention to provide a fluid processing system for subjecting the fluid flowing in the hollow product to a predetermined processing, and to provide a joining method of the hollow members.

According to a first aspect of the invention, there is provided a hollow product comprising hollow members joined to each other for allowing fluid to flow therein, wherein one of the hollow member is formed with a joining portion to be joined to the other hollow member by spinning working.

According to this aspect, since the one hollow member is formed with the joining portion by the spinning working, it is possible to provide a light-weight hollow product having excellent flow efficiency in which the joining portion is stably and reliably formed over the entire periphery of the one hollow member.

In the above aspect, the joining portion of the one hollow member formed by the spinning working can be joined to the other hollow member by friction welding.

With this arrangement, since the joining portion formed on the one hollow member is joined to the other hollow member by friction welding, it is possible to provide a hollow product for allowing the fluid to flow therein in which the hollow member is easily and reliably joined over the entire periphery without being affected by the thickness of the hollow member and a weight of the hollow product is reduced.

In the above aspect, any of the hollow members can be extended so as to be disposed in the joining portion.

With this arrangement, since any of the hollow members can be extended so as to be disposed radially inward of the joining portion, burr is prevented from being generated inside the hollow product due to the friction welding. Also, because the inside is formed continuously, it is possible to provide a hollow product having higher flow efficiency of the fluid.

Here, the joining portion can be formed such as to project outward in the intermediate portion of the one hollow member, the one hollow member can be inserted into the other hollow member, and the joining portion of the one hollow member can be joined to the other hollow member by the friction welding. A portion of the one hollow member from the connecting portion toward the tip end is located radially inward of the friction welding portion. Therefore, a burr is prevented from being generated inside the hollow product due to the friction welding.

Further, the joining portion is formed at an intermediate portion of the one hollow member stepwisely such as to be reduced in diameter toward the tip end, the one hollow member is inserted into the other hollow member, and the joining portion stepwisely formed on the one hollow member is joined to the tip end of the other hollow member by friction welding. With this structure, since the one hollow member is located radially inward of the friction welding portion, a burr is prevented from being generated inside the hollow product due to the friction welding.

Further, the joining portion may be formed such that the tip end thereof is increased in diameter wider than the intermediate portion of the one hollow member, the other hollow member is inserted into the one hollow member, and the diameter-increased tip end of the one hollow member and a portion of the other hollow member corresponding to the tip end are joined by the friction welding. Since the portion of the other hollow member from the connecting portion toward the tip end is located radially inward of the friction welding portion, a burr is prevented from being generated inside the hollow product due to the friction welding.

According to a second aspect of the invention, there is provided a fluid processing system comprising hollow members joined to each other, at least one of which is a hollow member having a processing function portion for subjecting fluid flowing into the hollow member to a predetermined processing, wherein one of the hollow member is formed with a joining portion to be joined to the other hollow member by spinning working.

According to the second aspect, since the one hollow member is formed with the joining portion to be joined to the other hollow member by the spinning working, it is possible to provide a light-weight fluid processing system having excellent flow efficiency in which the joining portion is stably and reliably formed over the entire periphery of the one hollow member.

In the above aspect, the joining portion of the one hollow member formed by the spinning working can be joined to the other hollow member by friction welding.

With this arrangement, since the joining portion formed on the one hollow member is joined to the other hollow member by friction welding, it is possible to provide a fluid processing system for subjecting the fluid flowing in the hollow member to a predetermined processing in which the hollow member is easily and reliably joined over the entire periphery regardless of the thickness of the hollow member, a weight of the hollow product is reduced, and the flow efficiency of the fluid is enhanced.

Further, any of the hollow members can be extended so as to be disposed radially inward of the joining portion.

With this arrangement, burr is prevented from being generated inside the hollow product due to the friction welding, and the inside is formed continuously. Therefore, it is possible to provide a fluid processing system having higher flow efficiency of the fluid.

According to a third aspect of the invention, there is provided a method for joining hollow members to each other for allowing fluid to flow therein, comprising the steps of: forming a joining portion on one of the hollow members by spinning working; and joining the joining portion of the one hollow member to the other hollow member by friction welding.

With the third aspect, the one hollow member is formed with the joining portion by the spinning working, and then the joining portion of the one hollow member and the other hollow member are joined to each other by friction welding. Thus, it is possible to provide a joining method of hollow members in which the hollow members are easily and reliably joined to each other over the entire periphery regardless of the thickness of the hollow member, and the flow efficiency of the fluid is excellent with reduced weight.

In the above aspect, in the step for joining the hollow member by friction welding, the joining portion can be formed on the one hollow member so that either one of the hollow members is disposed radially inward the joining portion.

With this arrangement, since one of the hollow members is extended so as to be disposed radially inward of the joining portion, burr is prevented from being generated inside the hollow product due to the friction welding, and the inside is formed continuously. Therefore, it is possible to provide a joining method of hollow members having higher flow efficiency of the fluid.

Further, at least one of the hollow members can have a processing function portion for subjecting fluid flowing in hollow member to a predetermined processing.

With this arrangement, it is possible to provide a joining method of hollow members which can be applied for manufacturing a fluid processing system for subjecting fluid flowing in the joined hollow members to a predetermined processing.

BRIEF DESCRIPTION OF THE DRAWINGS

FIG. 3 is a plan view of the apparatus shown in FIG. 2;

FIG. 5 is an enlarged explanatory view showing the friction welding shown in FIG. 4;

FIG. 8 is a sectional view for explaining a support apparatus which arranges and supports one hollow member and the other hollow member such that center axes thereof coincide with a coaxial extension line, and FIG. 8 shows a state before joining portions of both hollow members are joined to each other by friction welding;

FIG. 9 is an explanatory view for showing a state in which the joining portions of both the hollow members are joined to each other by the friction welding from the state shown in FIG. 8;

DETAILED DESCRIPTION

Figure 19:
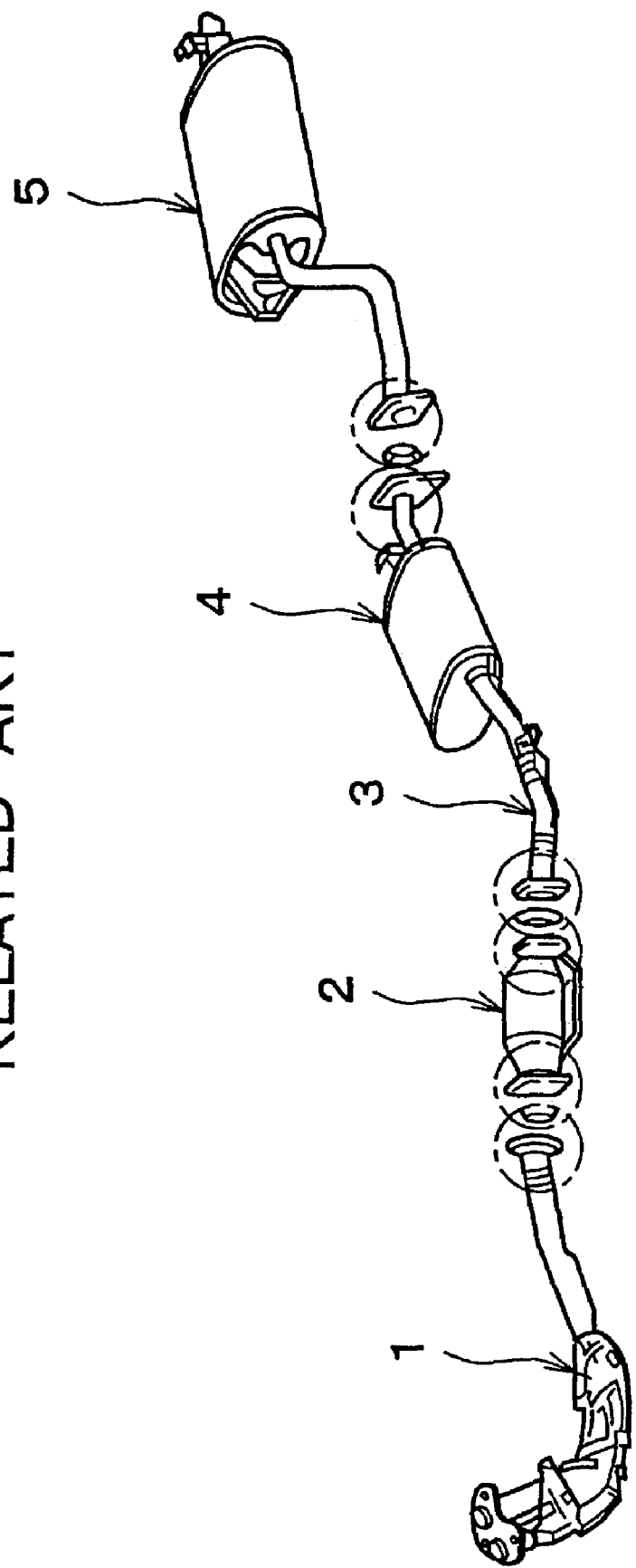
FIG. 19 is a perspective view of an exhaust system for a vehicle to which the invention is applied, the system being separated into each constituent unit.
Figure 20:
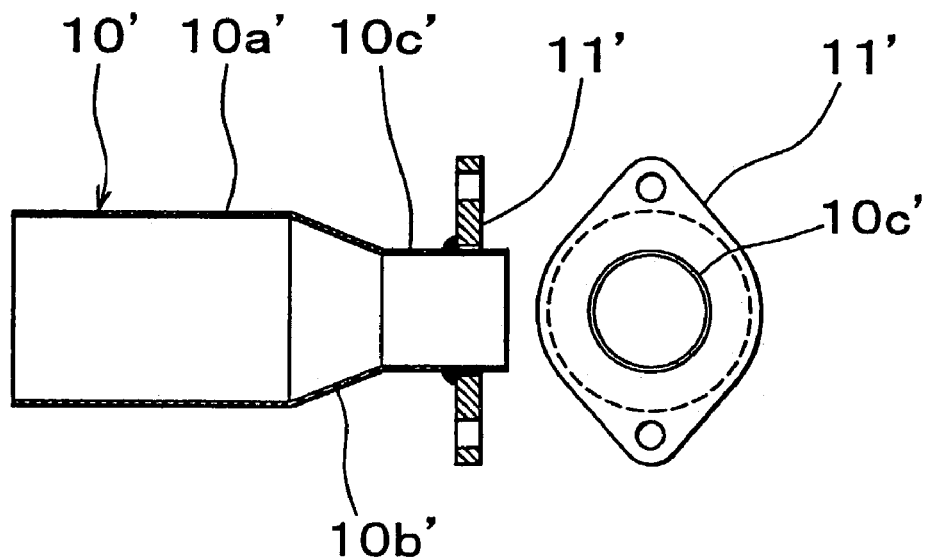
FIG. 20 is a sectional view for explaining related art in which a flange member is joined by cladding by welding.
Figure 21:
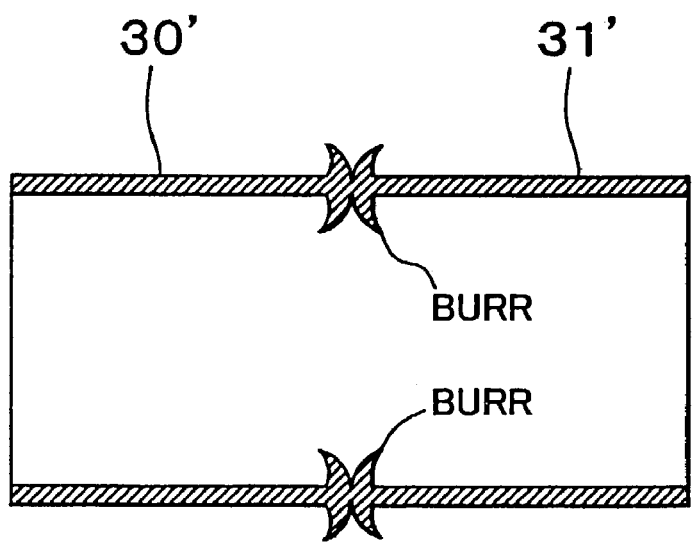
FIG. 21 is a sectional view for explaining a state in which a burr is generated also on an inner side by joining a hollow member by a conventional friction welding.

A first embodiment of the invention will be explained in detail based on FIGS. 1 to 11. In this embodiment, an exhaust system of an engine of a Vehicle as shown in FIG. 19 comprises a catalyst converter 2 (one of hollow members) which is one constituent unit for causing chemical reaction such as oxidation-reduction with respect to exhaust gas discharged from the engine and flowing through an exhaust manifold, thereby purifying the exhaust gas. The exhaust system also comprises a container 10 in which a catalyst carrier 12 (see FIG. 10) of the catalyst converter 2 as a processing function portion is accommodated. The container 10 comprises an accommodating portion 10a, cone portions 10b whose diameters are gradually reduced from the accommodating portion 10a, small-diameter connecting portions 10c connected to the accommodating portion 10a through the cone portions lob. A method for joining the connecting portions 10c and the flanges 11 (other hollow members) to be fastened to flanges 21 of other constituent units 1 and 3 will be explained.

The catalyst converter 2 which is the one constituent unit of the exhaust system as the hollow product of the invention is formed such that the one hollow member (connecting portion 10c of the container 10 of the catalyst converter 2 in which the catalyst carrier 12 is accommodated) is formed, by spinning working, with a joining portion 15 to be joined to a joining portion 16 of the other hollow member (flange member 11). Further, the joining portion 15 which was formed by spinning working is joined to the joining portion 16 of the other hollow member (flange member 11) by friction welding. One of the one hollow member (connecting portion 10c of the container of the catalyst converter) and the other hollow member (flange member 11) is extended such that one of them is disposed radially inward of the joining portions 15 and 16.

The joining method of the hollow members 10 and 11 of the invention comprises a step for forming the joining portion 15 on the one hollow member (connecting portion 10c of the container of the catalyst converter in which the catalyst carrier 12 is accommodated) by spinning working, and a step for joining this joining portion 15 and the joining portion 16 (of the flange member 11) of the other hollow member by friction welding. In the spinning working step, one of the one hollow member (connecting portion 10c of the container of the catalyst converter) and the other hollow member (flange member 11) is extended such that one of them is disposed radially inward of the joining portions 15 and 16.

Figure 10A:
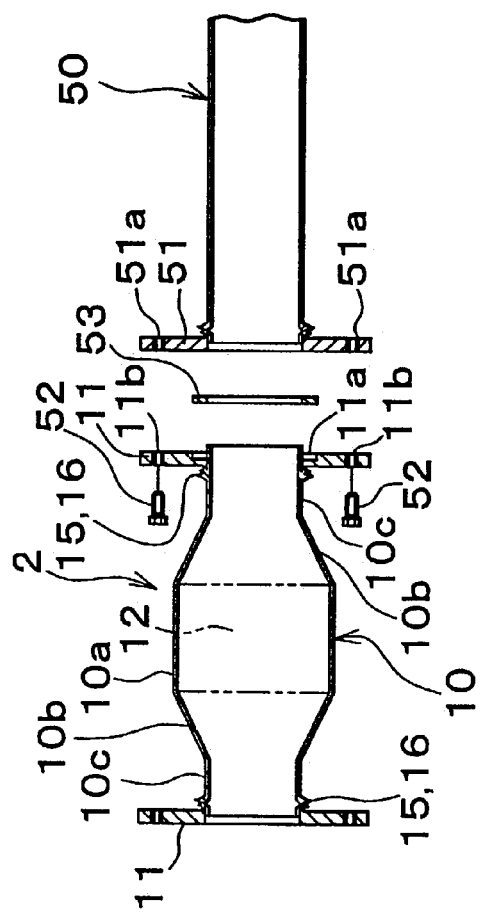
FIG. 10 is a sectional view for explaining a state in which a catalyst converter to which the flange member is joined is connected to a flange of another structure.
Figure 10B:
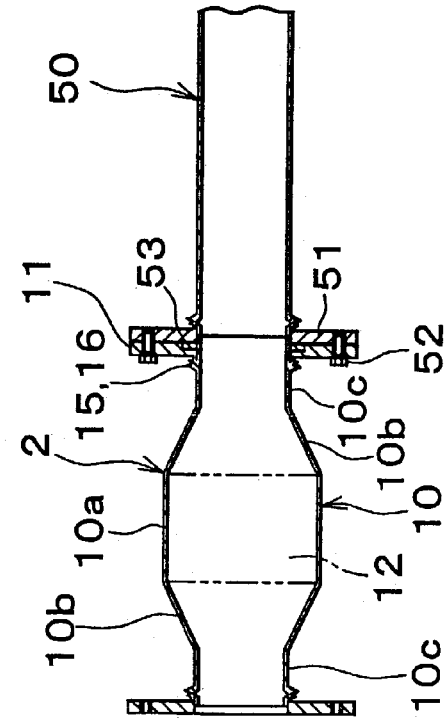

As shown in FIG. 1, the flange member 11 is formed such that a plate material which was formed into a predetermined shape is formed with a hole 20 and a periphery of the hole 20 is subjected to burring, thereby forming the flange member 11 into a hollow structure through which the connecting portion 10c of the container of the catalyst converter can be inserted (in the case of this embodiment), and a portion thereof projects from one surface of the flange member 11. In this embodiment, the portion projecting from the one surface of the flange member 11 constitutes the joining portion 16 which is to be joined to the joining portion of the catalyst converter which is formed as will be described later. As shown in FIG. 10, the flange member 11 is formed with an annular groove 11a for accommodating a seal member 53 to keep the air-tightness when the flange member 11 is abutted against and fastened to a flange member 51 which is another constituent unit by means of bolts 52. As shown in FIG. 10, the flange members 11 and 51 are such that one 11 of the flange members on the side of the catalyst converter 2 is formed with holes 11b through which the bolts 52 are inserted, and the other one 51 is formed with female screw holes 51a through which the bolts 52 are threaded.

Figures 1A, 1B:
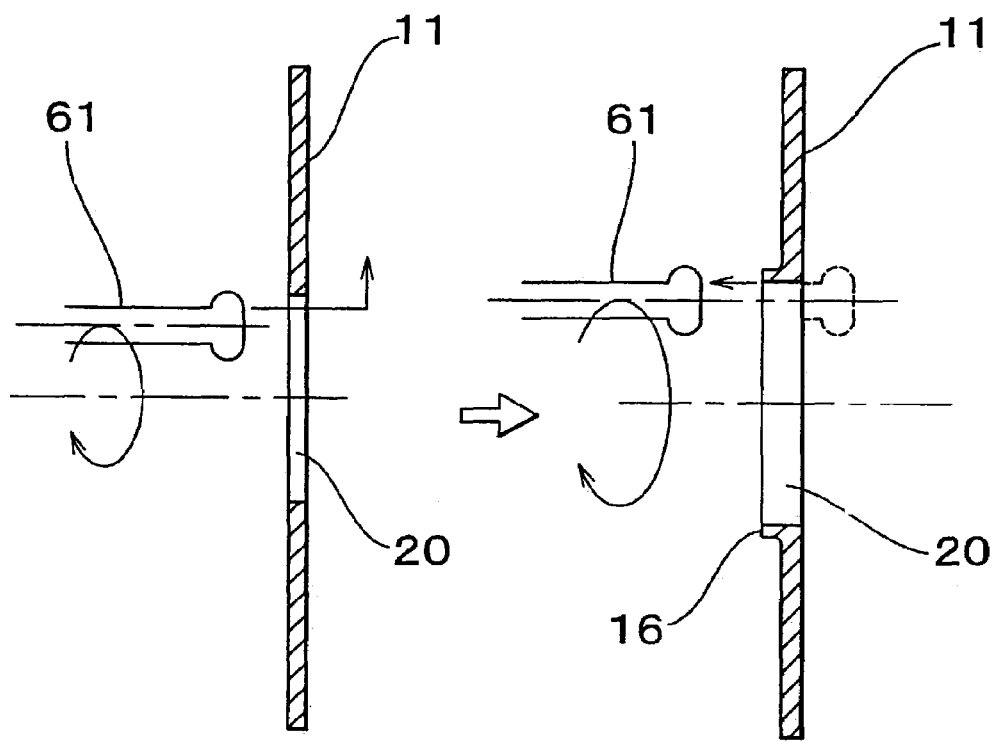
FIG. 1 is an explanatory view showing a state in which a flange member as a hollow member to which the-invention is applied is subjected to burring processing to form a joining portion.
Figure 2:
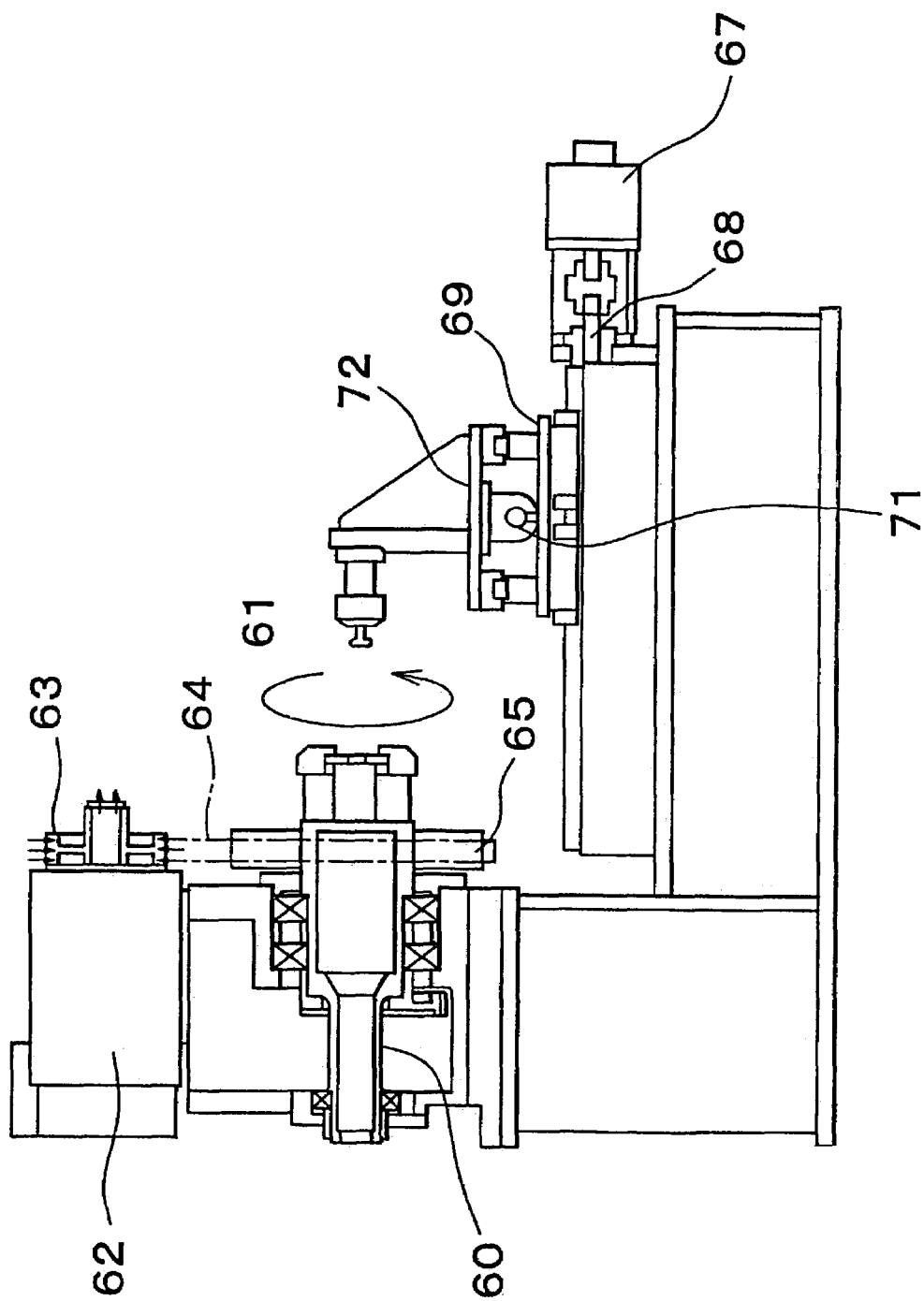
FIG. 2 is a front view of a burring apparatus.

As shown in FIGS. 2 and 3, one example of an apparatus for carrying out the burring working comprises a spindle 60 for retaining a plate material which will become the flange member 11 and for rotating the plate material around the hole 20, and a burring tool 61 which moves in a direction of rotational axis and a radial direction of the spindle 60. The spindle 60 includes a pulley 65 around which and a pulley 63 connected to a motor 62 is wound a belt 64, and a chuck 66 for retaining the plate material which will become the flange member 11. The burring apparatus includes an axially moving table 69 which is moved by a feed screw mechanism 68 driven by a servo motor 67, and a radially moving table 72 which is provided on the axially moving table 69 and moved by a feed screw mechanism 71 driven by a servo motor 70. The burring tool 61 is supported by the radially moving table 72. If the motor 62 is driven to rotate the spindle 60 through the belt 64, the plate material which will become the flange member 11 grasped by the chuck 66 is rotated around the previously formed hole 20. In this state, the servo motor 67 is driven to move the axially moving table 69 forward (move the table leftward in FIGS. 2 and 3), and the burring tool 61 is inserted into the hole 20 of the plate material which will become the flange member 11 such that the burring tool 61 does not contact the hole 20 as shown in FIG. 1A. The servo motor 70 is driven to move the radially moving table 72 outward in the radial direction, thereby bringing the burring tool 61 into contact with an inner periphery of the hole 20 of the plate material which will become the flange member 11. In this state, the servo-motor 67 is driven to move the axially moving table 69 backward (rightward in FIGS. 2 and 3), and the inner periphery of the hole 20 is formed such that the inner periphery projects toward one side. By repeating the above steps, the hole 20 can be formed into a size allowing the connecting portion 10c of the catalyst converter 2 to be inserted into the hole 20, and the hole 20 is formed such that the joining portion 16 projects from one surface of the flange member 11. The burring apparatus is not limited to the embodiment shown in FIGS. 2 and 3, as far as the burring tool can be relatively revolved around the hole 20 formed in the plate material which will become the flange member 11.

As shown in FIG. 4, the container 10 of the catalyst converter integrally comprises the tapered cone portion 10b tapered from the accommodating portion 10a of the catalyst carrier 12 toward the opposite ends and the reduced-diameter connecting portions 10c disposed at the opposite ends by repeatedly spinning working the pipe-like blank having a size capable of accommodating the catalyst carrier 12 while revolving a forming roller 81 relatively with respect to the pipe-like blank. In this invention, as shown in FIG. 4A, by pinning working the pipe-like blank, at least one cone portion 10b and the connecting portion 10c are formed into substantially the final shape and size, and as shown in FIG. 4B, a portion of each of the connecting portions 10c from the cone portion 10b to an axially intermediate portion of the connecting portion 10c are further drawn into a finally desired outer diameter and then, the forming roller 81 is once retreated radially outward. Then, as shown in FIG. 4C, the forming roller 81 is moved from the tip end of the connecting portion 10c to the axially intermediate portion, and that portion is drawn into the finally desired outer diameter. The portion of the connecting portion 10c on the side of the cone portion 10b and the tip end are reduced in diameter, and a material of the blank is gathered toward the axially intermediate portion of the connecting portion 10c at the time of diameter reduction. Therefore, the annular joining portion 15 is reliably formed at the axially intermediate portion of the connecting portion 10c over the entire periphery so as to project radially outward. An amount of projection of the joining portion 15 radially outward can be adjusted by a diameter reducing amount of the connecting portion 10c on the side of the cone portion 10b and the tip end side of the connecting portion 10c toward the axially intermediate portion, and a gathering amount of the material. The joining portion 15 may have an oblique surface, as shown in FIGS. 4D and 5A, prior to contact with the flange member 11.

Figure 4A:
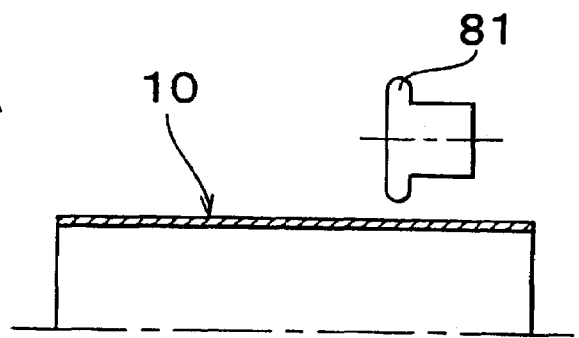
FIG. 4 is an explanatory view for sequentially showing shapes of the hollow member in each step according to a first embodiment.
Figure 4B:
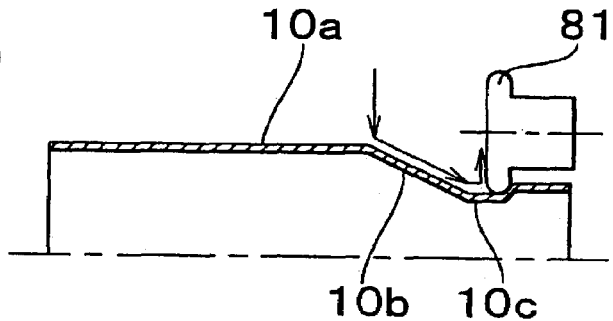
Figure 4C:
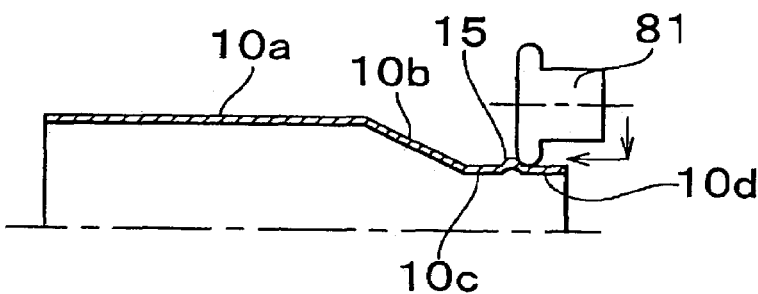
Figure 4D:
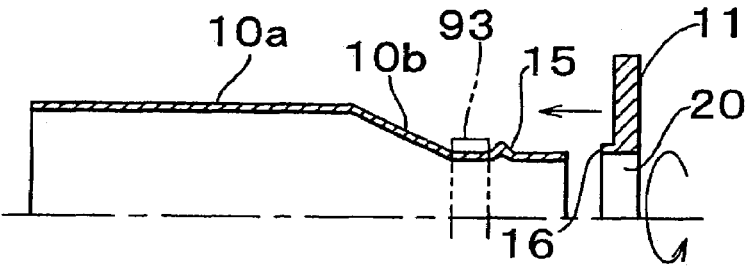
Figure 4E:
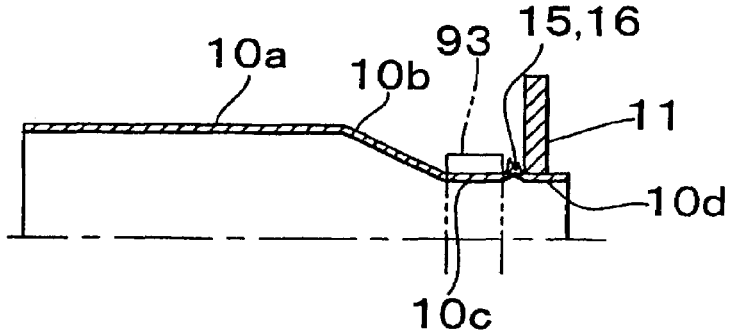

Next, as shown in FIG. 4D, the pipe-like blank which will become the container 10 of the catalyst converter formed with the connecting portion 10d having one of the cone portions lob and the joining portion 15, and the flange member 11 formed with the joining portion 16 by burring working are arranged and supported by a support apparatus 82 such that center axes thereof coincide with the coaxial extension line. The support apparatus 82 includes a chuck 90 for holding the flange member 11 mounted to a spindle (not shown) rotated about its axis and a shaft 92 pivoted by a bearing 91 provided at a center of the chuck 90. The flange member 11 held by the chuck 90 and the shaft 92 can relatively rotate. The shaft 92 is formed into such a size that the shaft 92 can be insertingly fit into the connecting portion 10c at the end of the container 10 of the catalyst converter 2 for supporting the same. A tip end of the shaft 92 is tapered to form an angle of about 5 to 15° with respect to an inner peripheral surface of the connecting portion 10c. In the case of this embodiment, the connecting portion 10c formed at the end of the container 10 of the catalyst converter 2 is non-rotatably clamped and fixed by a clamper 93 as shown in FIGS. 4D and 4E. The spindle (not shown) provided with the chuck 90 and the shaft 92 as well as the clamper 93 for clamping the container 10 of the catalyst converter 2 can move relatively in the axial direction.

In a state in which the connecting portion 10c of the container of the catalyst converter is non-rotatably clamped by the clamper 93 and the flange member 11 is held by the chuck 90, if the spindle (not shown) provided with the chuck 90 is rotated about its axis thereby rotating the flange member 1, the flange member 11 and the container 10 of the catalyst converter are relatively moved closer to each other in the axial direction while rotating the flange member 11, the shaft 92 is first inserted from the end of the connecting portion 10c of the container of the catalyst converter, and the flange member 11 are aligned to each other. Since the shaft 92 is rotatably supported independent from the flange member 11 held by the chuck 90, the shaft 92 does not rotate relative to the clamped container 10 of the catalyst converter. Accordingly, friction heat does not generate between the container 10 of the catalytic converter and the shaft 92. Therefore, even if a thickness t of the container 10 of the catalyst converter is thin, it is possible to prevent the container 10 of the catalyst converter from being melted and damaged by the friction heat.

If the container 10 of the catalyst converter and the flange member 11 are relatively moved closer to each other in the axial direction, the connecting portion 10c of the container of the catalyst converter is inserted into the flange member 11. As shown in FIGS. 4E, 5 or 9, contacted end surfaces of both joining portions 15 and 16 are softened by applying a pushing force to a predetermined margin Y with a predetermined upset pressure, thereby carrying out the friction welding. By carrying out the friction welding, burrs are generated on both joining portions 15 and 16. In this invention, however, since the joining portion 15 is formed at the axially intermediate portion of the connecting portion 10c of the container of the catalyst converter, i.e., since a portion 10d between the joining portion 15 and the tip end of the connecting portion 10c extends to a position inside of the flange member 11 when the connecting portion 10c of the container of the catalyst converter is inserted into the flange member 11 for carrying out the friction welding, the portion 10d is disposed radially inward of the joining portions 15 and 16. Therefore, the burr is generated only outside in the radial direction of both the joining portions 15 and 16, and no burr is generated inside the catalyst converter 2. The burr generated outside in the radial direction of both the joining portions 15 and 16 can easily be removed if necessary. The container 10 of the catalyst converter and the joining portions 15 and 16 of the flange 11 are joined air-tightly over the entire periphery by carrying out the friction welding.

Figure 6A:
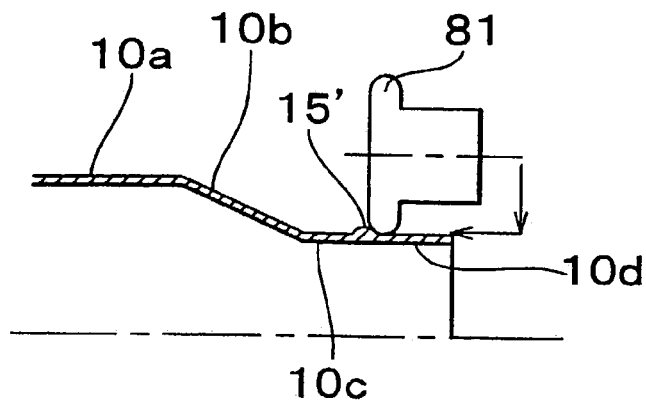
FIG. 6 is an explanatory view of a modification of the first embodiment of the invention in which a margin necessary for the friction welding is 1.5 times with respect to a plate thickness of a joining portion of a container of a catalyst converter.
Figure 6B:
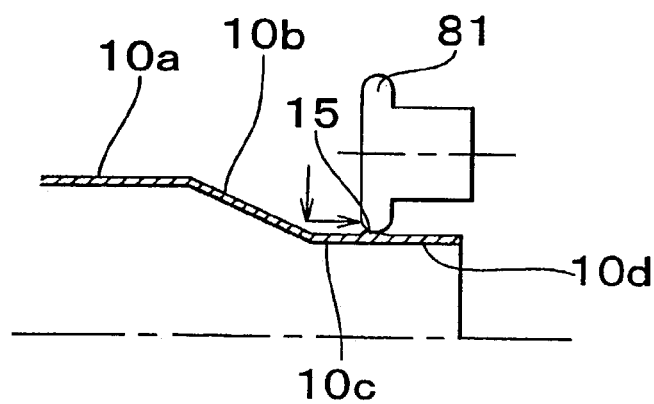
Figure 6C:
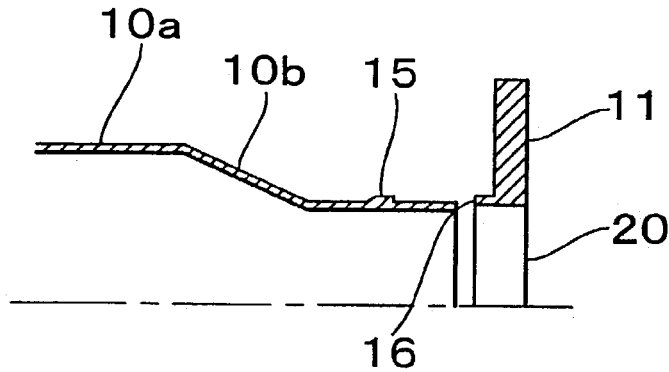
Figure 6D:
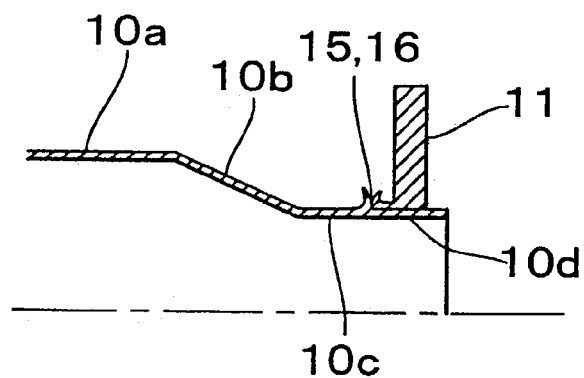
Figure 7A:
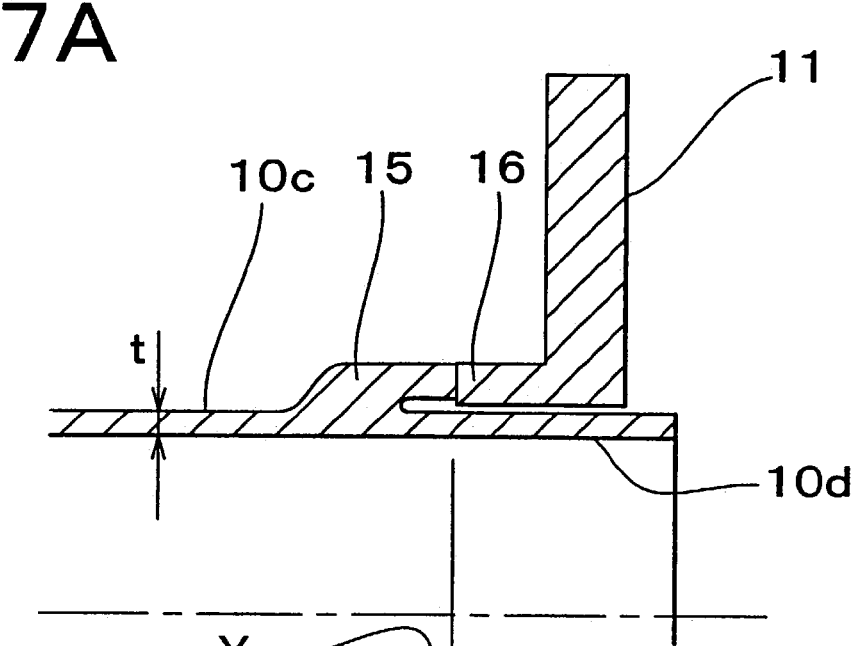
FIG. 7 is an enlarged explanatory view showing the friction welding shown in FIG. 6.
Figure 7B:
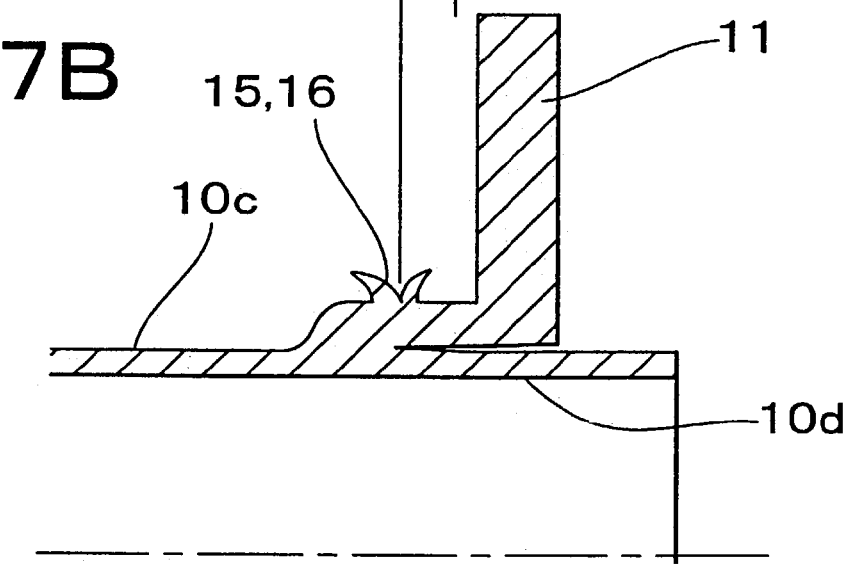

Here, as shown in FIG. 7, if the margin Y which is necessary for the friction welding is 1.5 time greater than the thickness t of the connecting portion 10c of the container of the catalyst converter, it is difficult to form the joining portion 15 having the axial thickness corresponding to the margin Y only by the diameter reducing amount of the connecting portion 10c from its portion on the side of the cone portion lob and its portion from the tip end toward the axially intermediate portion, and by the gathering amount of the material. Therefore, in such a case, as shown in FIG. 6A, an annular projection 15' projecting radially outward is formed on the axially intermediate portion of the connecting portion 10c of the container of the catalyst converter such that its projecting amount is greater than that of the joining portion 15 shown in FIGS. 4 and 5, and the spinning working is carried out such that the projection 15' is inclined toward the tip end of the joining portion by the forming roller as shown in FIG. 6B. With this arrangement, as shown in FIGS. 7A and 7B, it is possible to form the joining portion 15 having the axial thickness 1.5 time greater than the thickness t capable of sufficiently corresponding to the margin Y necessary for the friction welding.

This invention is not limited to the above embodiment, and the container 10 of the catalyst converter 2 and both the joining portions 15 and 16 of the flange member 11 may be relatively rotated. In this friction welding, it is preferable that the relative rotation number and pushing speed of the flange member 11 and the connecting portion 10c of the container of the catalyst converter are kept constant until plastic flowing layers are formed on abutting surfaces of both the joining portions 15 and 16 and then, the relative rotation number is reduced at a predetermined speed-reduction ratio until the rotation is stopped, and the pushing force is stopped thereafter.

If the container 10 of the catalyst converter 2 is formed at its one side with the cone portion 10b and the connecting portion 10c by the spinning working, the catalyst carrier 12 is inserted from the other side end. This other side ends is subjected to the spinning working similarly, and the cone portion 10b and the connecting portion 10c are integrally formed. The other side connecting portion 10c is also formed with the same joining portion 15, and this joining portion 15 is joined to the joining portion 16 of the flange member 11 by friction welding. In the container 10 of the catalyst converter 2 of the embodiment shown in FIGS. 4 to 7, the one joining portion 15 is joined such as to slightly project from the flange member 11. Therefore, as shown in FIG. 10, the other constituent unit to be connected to the connecting portion 10c is joined such as to slightly project from the tip end of a connecting portion 50 of the hollow member such as a pipe of the other constituent unit. Thus, when the flange members 11 and 51 are fastened to each other, ends of both connecting portions 10c and 50 abut against each other in the flange member 51 of the other constituent unit.

Figure 11:
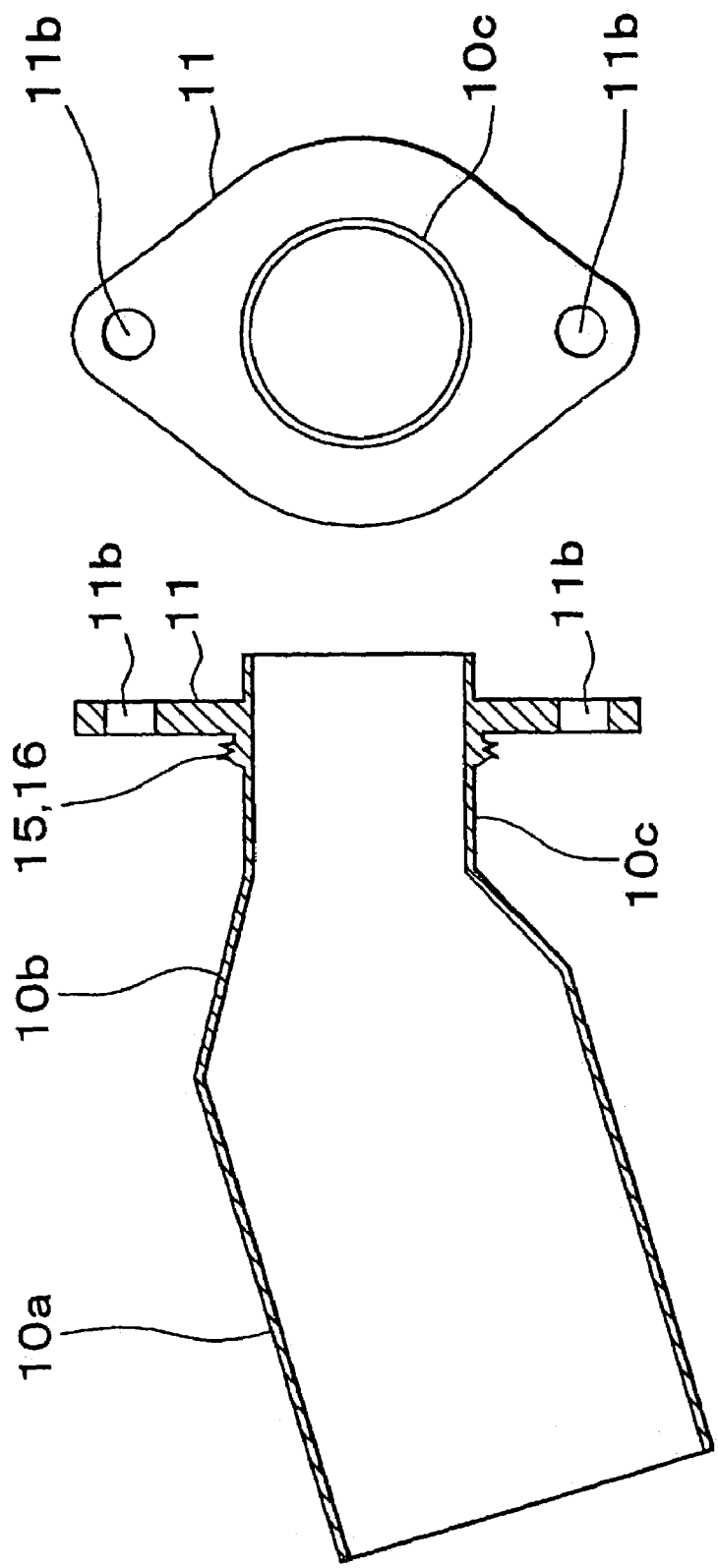
FIG. 11 is an explanatory view for showing a state in which the flange member is connected at a predetermined phase, to a container of the catalyst converter which is formed such that it is deviated in angle.

In addition to the above-described embodiment, the invention can also be applied to a state in which the axis of the connecting portion 10c of the container of the catalyst converter is inclined with respect to the axis of the accommodating portion 10a of the catalyst carrier 12 at a predetermined angle as shown in FIG. 11. In this case, at the time of the friction welding, by setting the phase for stopping the relative rotation of the flange member 11 with respect to the connecting portion 10c, it is possible to join the flange member 11 at a phase position set with respect to the inclined catalyst converter 2 so that the flange member 11 can coincide with the phase of the flange member 51 of the other constituent unit.

Next, a second embodiment of the invention will be explained based on FIG. 12. In the following description, only portion different from the above embodiment will be explained, and the same or corresponding portions will be designated with the same symbols, and explanation thereof will be omitted.

Figure 12A:
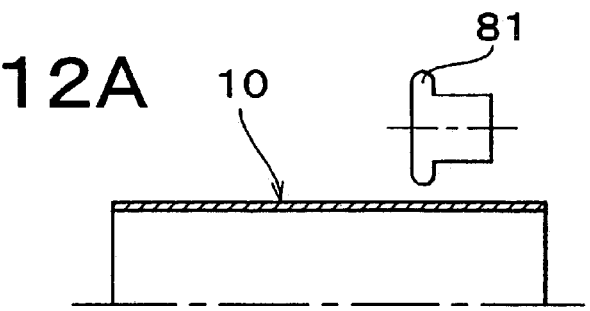
FIG. 12 is an explanatory view for sequentially showing shapes of the hollow member in each step according to a second embodiment.
Figure 12B:
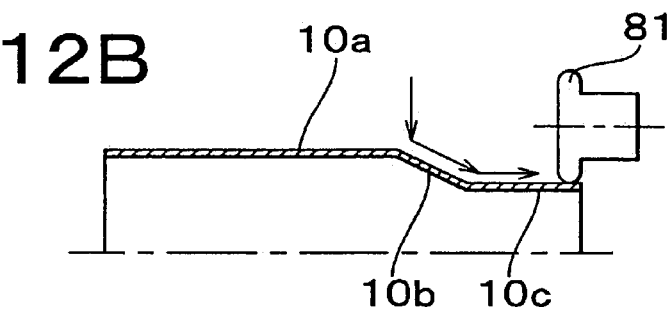
Figure 12C:
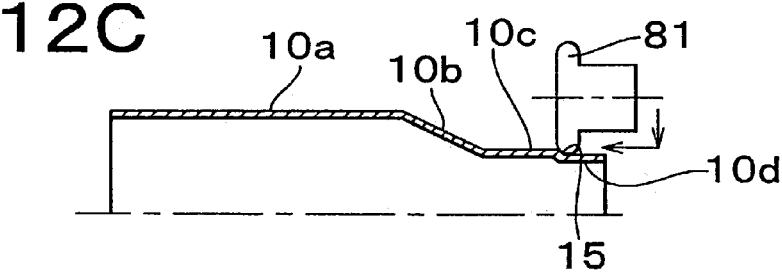
Figure 12D:
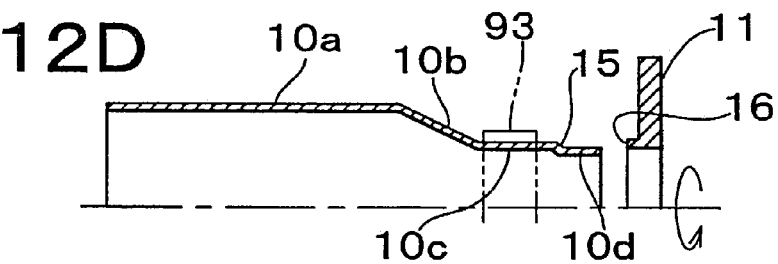
Figure 12E:
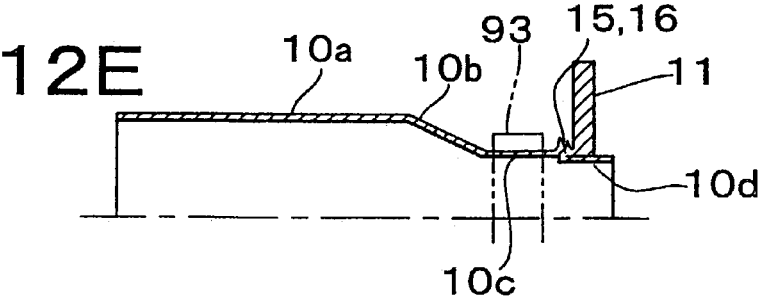

In this embodiment, as shown in FIG. 12A, the pipe-like blank is subjected to spinning working so that at least one of the cone portion 10b and the connecting portion 10c is formed into the final shape and size as shown in FIG. 12B. Then, as shown in FIG. 12C, the connecting portion 10c from its axially intermediate portion to the tip end portion 10*d* is reduced in diameter to such a degree that the connecting portion 10*c* can be inserted into the flange member 11 by means of the spinning working, thereby drawing a step-like joining portion 15 over its entire periphery. The radial size of the step-like joining portion 15 of the connecting portion 10*c* is set such that the connecting portion 11*c* can be inserted into the flange member 11 and the connecting portion 10*c* can be friction welded to an end face projecting from one surface of the flange member 11 which will become the joining portion 16. Then, as shown in FIG. 12D, the flange member 11 formed with the joining portion 16 and the pipe-like blank which will become the container 10 of the catalyst converter 2 formed with the connecting portion 10*c* having the one cone portion 10*b* and the joining portion 15 are disposed by the support apparatus such that the center axes thereof coincide with the coaxial extension line. In a state in which the container 10 of the catalyst converter is clamped and fixed by a clamper 93, the flange member 11 is moved in the axial direction while being rotated, the flange member 11 is insertingly fit outside the connecting portion 10*c* of the container of the catalyst converter. Then, as shown in FIG. 12E, the friction welding is carried out for softening and welding the contacted end surfaces of the joining portions 15 and 16 by applying a pushing force to a predetermined margin Y with a predetermined upset pressure. At that time, since the reduced-diameter portion 10*d* of the connecting portion 10*c* is extended toward the flange member 11 and located radially inward of the joining portions 15 and 16, like the above embodiment, a burr is generated only radially outside of the joining portions 15 and 16 when the friction welding is carried out, and no burr is generated inside the catalyst converter 2.

Next, a third embodiment of the invention will be explained based on FIGS. 13 to 15. In the following description, only portion different from the above embodiment will be explained, and the same or corresponding portions will be designated with the same symbols, and explanation thereof will be omitted.

Figure 13A:
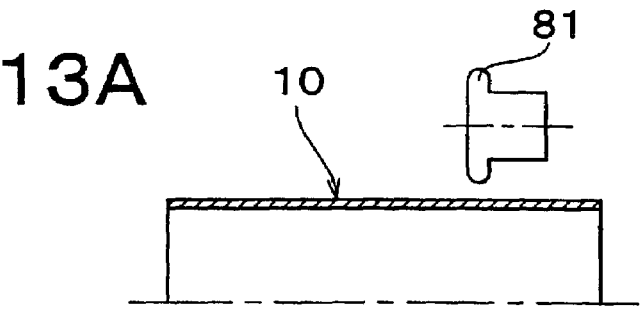
FIG. 13 is an explanatory views for sequentially showing shapes of the hollow member in each steps according to a third embodiment.
Figure 13B:
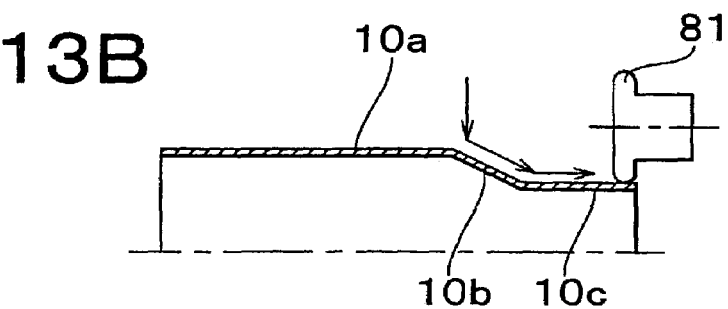
Figure 13C:
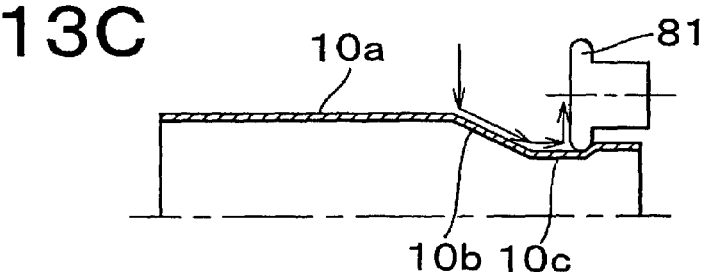

In this embodiment, as shown in FIG. 13A, the pipe-like blank is subjected to spinning working so that at least one of the cone portion 10*b* and the connecting portion 10*c* are formed into the final shape and size as shown in FIG. 13B. A size of a portion which will become the step-like joining portion 15 is set such that the portion projecting from one surface of the flange member 11 can be inserted into joining portion 15. Next, as shown in FIG. 13C, a portion of the connecting portion 10*c* from the cone portion 10*b* to the axially intermediate portion is further drawn into the finally desired outer diameter, and the forming roller 81 is once retreated radially outward. The connecting portion 10*c* of the container of the catalyst converter is formed such that a diameter of the portion 10*d* of the connecting portion 10*c* from the axially intermediate portion to the tip end thereof is increased relatively over the entire periphery. In the case of this embodiment, the joining portion 15 of the container 10 of the catalyst converter comprises a tip end surface and an inner peripheral surface of the connecting portion 10*c* formed so as to be increased in diameter relatively. The joining portion 16 of the flange member 11 comprises a periphery of a portion projecting from one surface thereof and an outer peripheral surface of this portion. It is preferable to set an inner diameter of the connecting portion 10*c* from the cone portion 10*b* to the axially intermediate portion thereof and an inner diameter of the flange member 11 substantially equal to each other. The tip end of the portion projecting from the one surface of the flange member 11 is set such that it does not come into contact with the connecting portion 10*c* of the container of the catalyst converter.

Figure 13D:
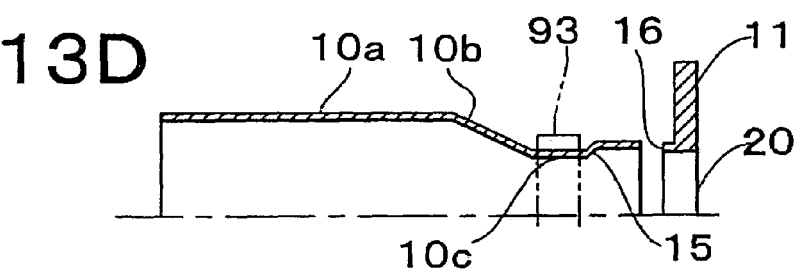
Figure 13E:
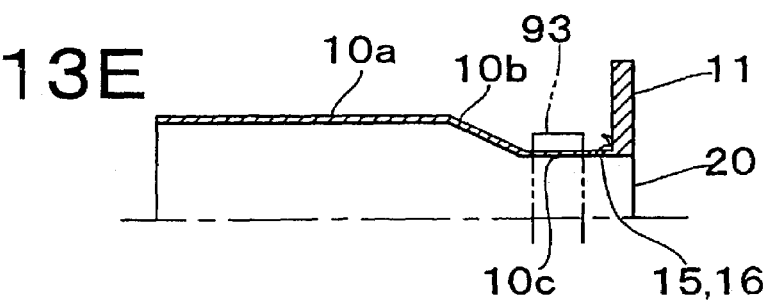

Then, as shown in FIG. 13D, the pipe-like blank which will become the container 10 of the catalyst converter formed with the connecting portion 10*c* having one cone portion 10*b* and the joining portion 15 and the flange member 11 formed with the joining portion 16 are supported by the support apparatus, and the center axes are disposed so as to coincide with the coaxial extension line. In a state in which the container 10 of the catalyst converter is clamped and fixed by a damper 93, the flange member 11 is moved in the axial direction while being rotated, the flange member 11 is insertingly fit outside the connecting portion 10*c* of the container of the catalyst converter. Then, as shown in FIG. 13E, the friction welding is carried out for softening and welding the contacted end surfaces of both the joining portions 15 and 16 by applying a pushing force to a predetermined margin with a predetermined upset pressure. At that time, since the portion of the flange member 11 projecting from one surface thereof is extended toward the connecting portion 10*c* of the container of the catalyst converter and located radially inward of both the joining portions 15 and 16, like the above embodiment, a burr is generated only radially outside of the joining portions 15 and 16 when friction welding is carried out, and no burr is generated inside the catalyst converter 2. When the inner diameter of the flange member 11 and the inner diameter of the connecting portion 10*c* from the cone portion 10*b* to the axially intermediate portion are set substantially equal to each other, it is possible reduce the flow resistance of the fluid such as exhaust gas flowing through the exhaust system.

Figure 14:
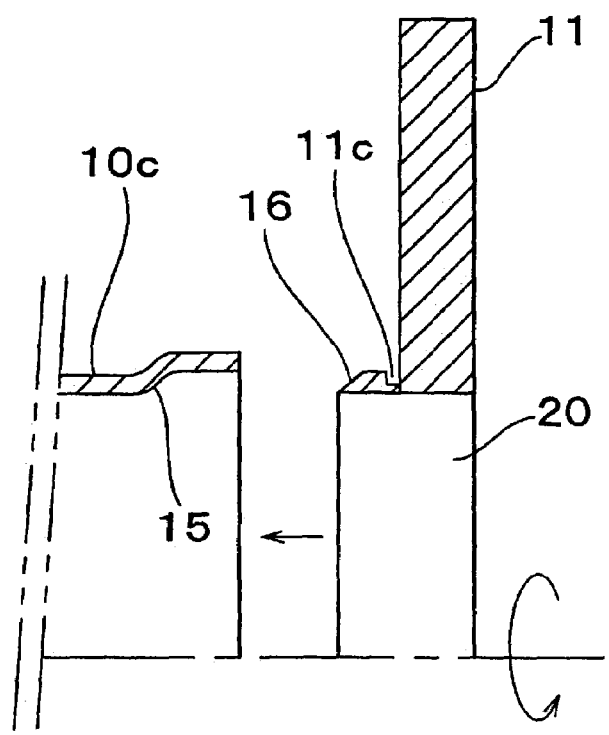
FIG. 14 is an enlarged sectional view showing a state before friction welding of a modification of an embodiment shown in FIG. 13 is carried out.
Figure 15:
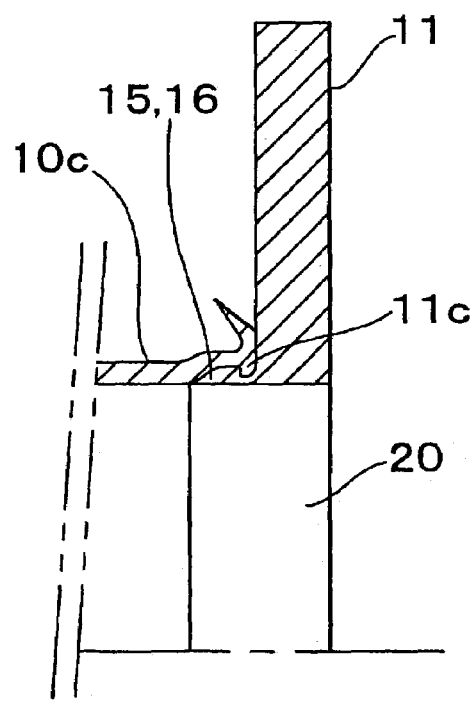
FIG. 15 is an explanatory view showing a state in which the joining portions of both hollow members are connected to each other by friction welding from the state shown in FIG. 13.

In this embodiment, as shown in FIGS. 14 and 15, it is preferable to form a groove 11*c* in an outer periphery of a base end of a portion projecting from one surface of the flange member 11. By forming the groove 11*c*, at a time of friction welding the joining portions 15 and 16, a material of the connecting portion 10*c* of the container of the catalyst converter is softened, and the material flows into the groove 11*c* of the flange member 11 and is welded. Therefore, it is possible to strengthen the junction between the flange member 11 and the connecting portion 10*c* of the container of the catalyst converter.

Next, a fourth embodiment of the invention will be explained with reference to FIG. 16 based on a case in which both the hollow members to be joined are pipes 30 and 31 used in an exhaust system or the like. In the following description, only portion different from the above embodiment will be explained, and the same or corresponding portions will be designated with the same symbols, and explanation thereof will be omitted.

Figure 16A:
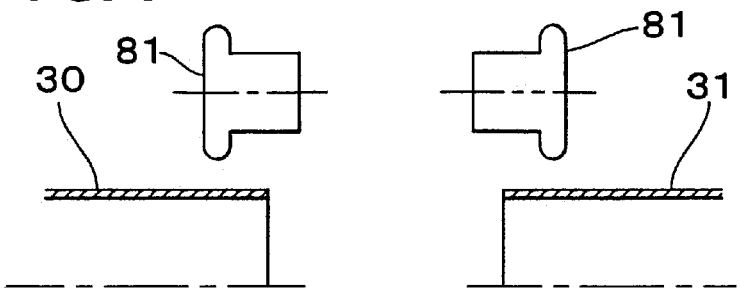
FIG. 16 is an explanatory view for sequentially showing shapes of the hollow member in each step according to a fourth embodiment.

In each of FIGS. 16A, 16B, 16D, and 16E, a left side pipe will be referred to as "one pipe 30," and a right side pipe will be referred to as "the other pipe 31." As shown in FIG. 16A, straight pipes having substantially the same diameter are used as the pipes 30 and 31.

Figure 16B:
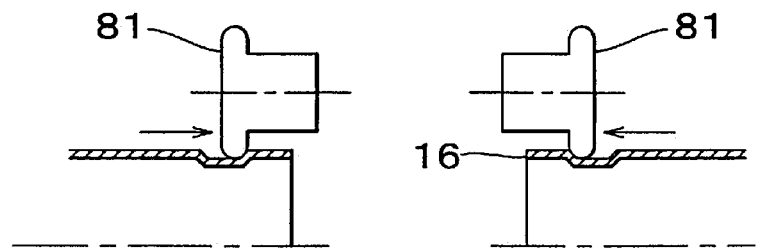
Figure 16C:
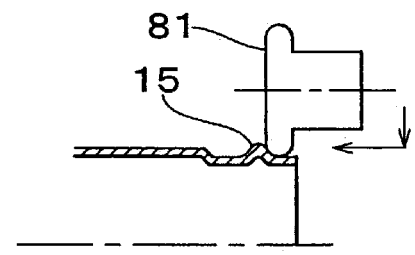

As shown in FIG. 16B, the forming roller 81 is moved rightward in FIG. 16B by a predetermined length in the axial direction from a predetermined position in the vicinity of a tip end toward the tip end of the one pipe 30 while relatively revolving the forming roller 81, so as to subject the one pipe 30 to spinning working to reduce its diameter. Next, as shown in FIG. 16C, the forming roller is moved leftward in FIG. 16C by a predetermined length in the axial direction from the tip end of the one pipe 30 while relatively revolving the forming roller 81 so as to subject the one pipe 30 to spinning working to reduce its diameter. With this operation, the annular joining portion 15 projecting radially outward is formed on a portion of the one pipe 30 in the vicinity of the tip end. When portions of the joining portion 15 in FIG. 16 to its left and right are reduced in diameter, material of one pipe 30 is gathered by moving the forming roller 81 toward the joining portion 15 in the axial direction. Therefore, the joining portion 15 can have sufficient thickness in the axial direction and in the radial direction for friction welding with respect to the joining portion 16 of the other pipe 31.

As shown in FIG. 16B, the forming roller 31 is moved leftward in FIG. 16B by a predetermined length in the axial direction from a predetermined position in the vicinity of a tip end toward the tip end of the other pipe 31 while relatively revolving the forming roller 81, so as to subject the other pipe 31 to spinning working to reduce its diameter. An original diameter of the tip end of the other pipe 31 is maintained, and the joining portion 16 is constituted by a tip end surface of the other pipe 31.

Figure 16D:
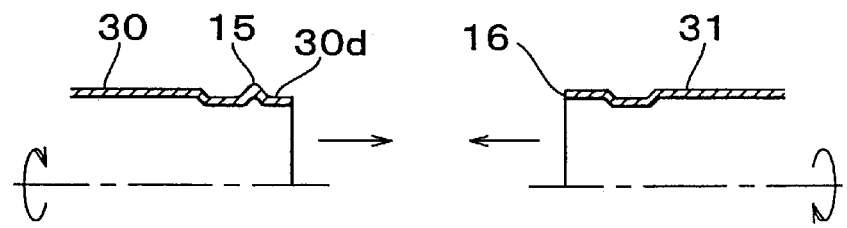
Figure 16E:
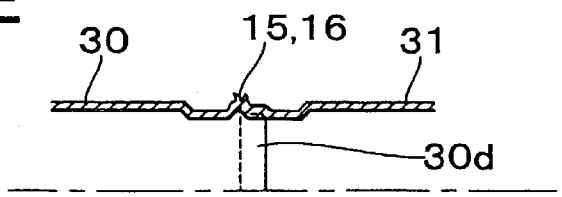

As shown in FIG. 16D, both the pipes 30 and 31 formed in the above-described manner are disposed such that their center axes coincide with the coaxial extension line, they are moved in the axial direction closer to each other while rotating relatively about the axis. As shown in FIG. 16E, the one pipe 30 is inserted into the other pipe 31, and friction welding is carried out by softening and welding the contacted end surfaces of the joining portions 15 and 16 by applying a pushing force to a predetermined margin Y with a predetermined upset pressure. At that time, since a portion 30d of the one pipe 30 extends from the joining portion 15 to the tip end so as to be positioned radially inward of the joining portions 15 and 16, a burr is generated only radially outside the joining portions 15 and 16, and no burr is generated inside the pipes 30 and 31.

Next, a fifth embodiment of the invention will be explained with reference to FIG. 17 based on a case in which the hollow members to be joined are inner pipe 40 and an outer pipe 41 constituting a double hollow product used for the catalyst converter 2 of the exhaust system. In the following description, only portion different from the above embodiment will be explained, and the same or corresponding portions will be designated with the same symbols, and explanation thereof will be omitted.

Figure 17A:
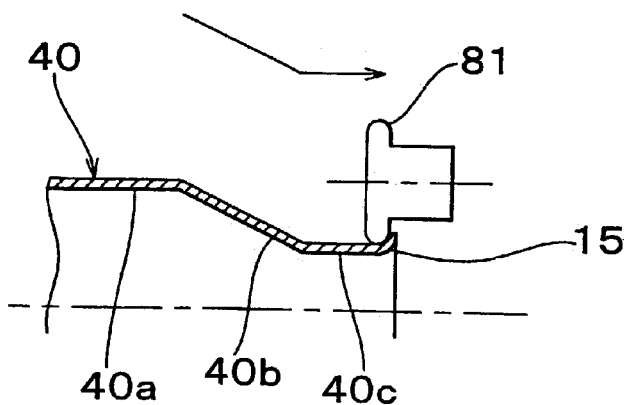
FIG. 17 is an explanatory view for sequentially showing shapes of the hollow member in each step according to a fifth embodiment.
Figure 17B:
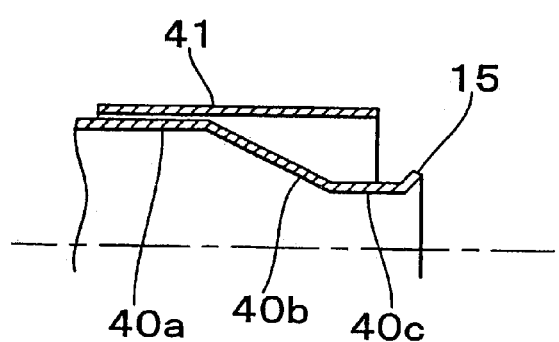
Figure 17C:
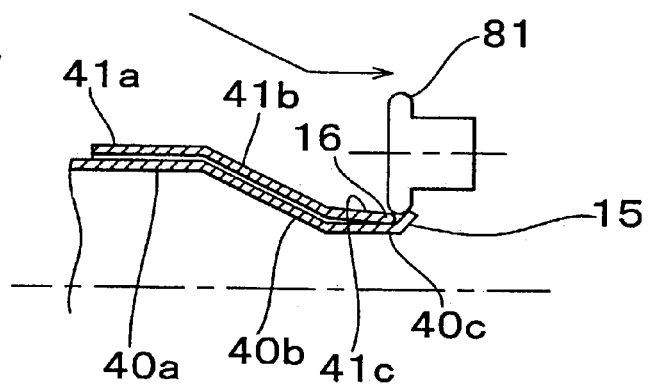
Figure 17D:
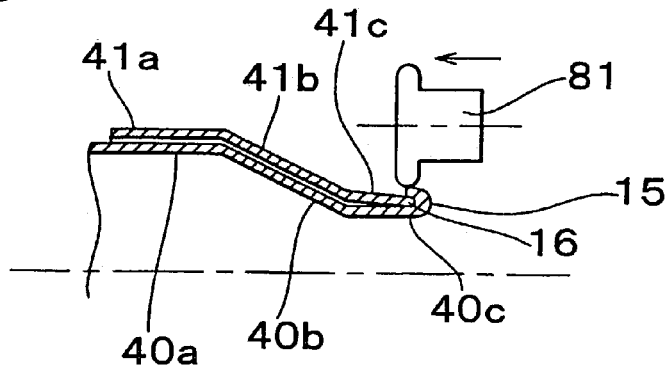

In this embodiment, as shown in FIG. 17A, a pipe-like blank having a size capable of accommodating the catalyst carrier 12 is subjected to spinning working while revolving the forming roller 81 relatively. Accordingly, the inner pipe 40 is integrally formed with cone portions 40b which is tapered toward opposite ends of the inner pipe 40 from an accommodating portion 40a of the catalyst carrier 12 and reduced-diameter connecting portions 40c disposed on opposite ends. An end of each of the connecting portion 40c is increased in diameter radially outward, thereby forming the joining portion 15. As shown in FIG. 17B, a cylindrical blank constituting the outer pipe 41 is disposed outside of the inner pipe 40 formed in this manner at a predetermined distance from the accommodating portion 40a of the catalyst carrier 12 of the inner pipe 40 in the radial direction. Then, as shown in FIG. 17C, by repeatedly subjecting the outer pipe 41 to the spinning working while revolving the forming roller 81 relatively, the outer pipe 41 is reduced in diameter while maintaining a predetermined distance in the radial direction between the accommodating portion 40a for the catalyst carrier 12, the tapered cone portions 40b, and the connecting portions 40c of the inner pipe 40. At that time, an end of the outer pipe 41 substantially coincides with a boundary of the diameter-increased portion 15 of the end formed on the connecting portion 40c of the inner pipe 40, which constitutes the joining portion 16. Thereafter, as shown in FIG. 17D, by carrying out the spinning working while revolving the forming roller 81, the diameter-increased portion of the end formed on the connecting portion 40c of the inner pipe 40 is turned back, and the end of the outer pipe 41 is sandwiched and clamped between the connecting portion 40c of the inner pipe and the turned back portion 15 in such a manner that air-tightness can be maintained.

In a state in which the end 16 of the outer pipe 41 is sandwiched and clamped between the connecting portion 40c of the inner pipe and the turned back portion 15, the inner pipe 40 and the outer pipe 41 are pressed by the forming roller 81 while being relatively revolved about the axis, and the joining portions 15 and 16 of both the pipes 40 and 41 are joined to each other by the friction welding.

Next, a sixth embodiment of the invention will be explained with reference to FIG. 18 based on a case in which the hollow members to be joined are inner pipe 40' and an outer pipe 41' constituting a double straight pipes used for the exhaust system. In the following description, only portion different from the above embodiment will be explained, and the same or corresponding portions will be designated with the same symbols, and explanation thereof will be omitted.

Figure 18A:
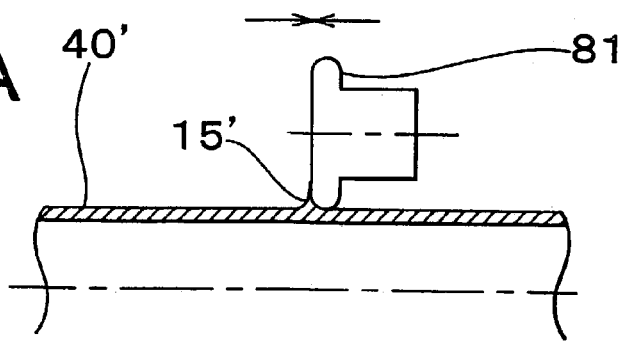
FIG. 18 is an explanatory view for sequentially showing shapes of the hollow member in each step according to a sixth embodiment.
Figure 18B:
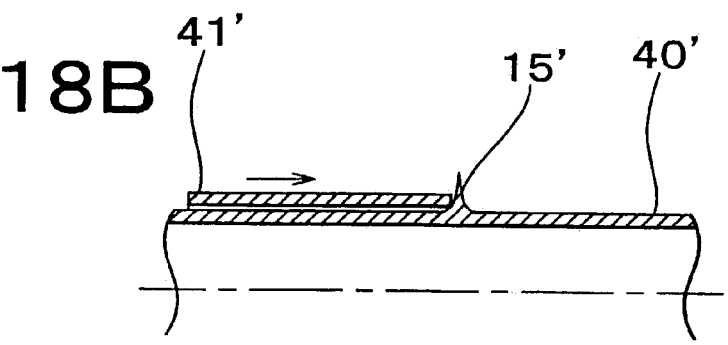
Figure 18C:
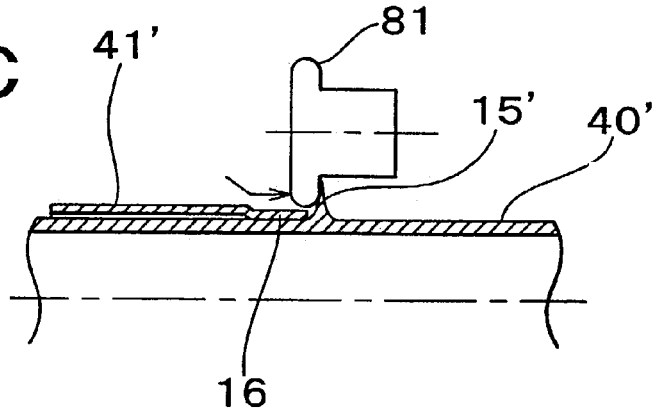
Figure 18D:
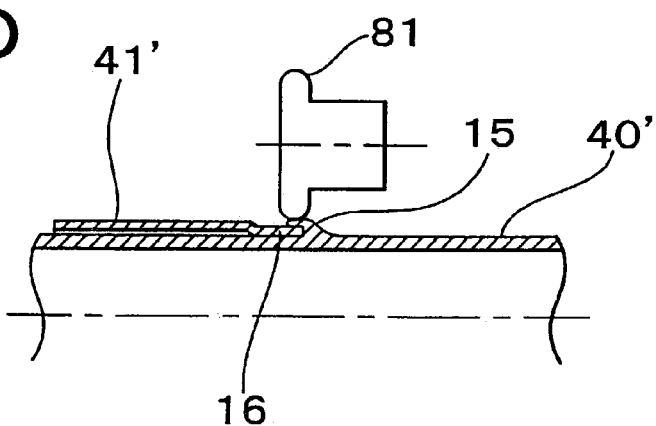

In this embodiment, as shown in FIG. 18A, by moving the forming roller 81 in the axial direction with respect to the pipe-like blank so as to gather material thereof toward an axially intermediate position while relatively revolving the forming roller 81, an annular projection 15' projecting radially outward for constituting the joining portion 15 is formed on the inner pipe 40' in its axially intermediate portion. As shown in FIG. 18B, the outer pipe 41' is fitted over the inner pipe 40' formed with the projection 15' at a predetermined distance from the inner pipe 40' in the radial direction. Then, as shown in FIG. 18C, an end of the outer pipe 41' is reduced in diameter so that the end comes into contact with the projection 15' of the inner pipe 40' by relatively revolving the forming roller 81. Thereafter, the projection 15' formed on the inner pipe 40' is inclined while relatively revolving the 81, an end of the outer pipe 41' is sandwiched and clamped between the joining portion 15 formed by the projection 15' and an outer peripheral surface of the inner pipe 40', thereby joining the two pipes. In this embodiment also, like the embodiment shown in FIG. 17, the inner and outer pipes are pushed by the forming roller 81 while relatively rotating the pipes about the axis, and the joining portions 15 and 16 of both the pipes 40' and 41' can be joined to each other by friction welding.

The invention is not limited to the above embodiments, and can be applied to a system requiring flow efficiency of fluid. That is, the invention is suitable for a fluid processing system having a functional material as the processing function portion for subjecting flowing fluid to a predetermined processing by bringing the fluid into contact with the function material to exert physical effect and/or chemical effect on the fluid. Application includes, in addition to the catalyst for causing chemical reaction such as oxidation-reduction with respect to exhaust fluid as the processing function portion, an exhaust system having a muffler for reducing noise, and an intake system having a filter for physically separating the intake fluid. The invention can also be applied to other fluid processing system such as a combustion engine other than one for a vehicle only if the system has a processing function portion for subjecting flowing fluid to a predetermined processing. The fluid itself is not limited to gas, and the state of material is not limited as long as the fluid has flowability such as mixture of liquid and gas and/or liquid and power including small solid.

The invention claimed is:

1. A hollow product comprising two hollow members joined to each other for allowing fluid to flow therethrough, wherein
one of said two hollow members is formed with a joining portion by spinning working, and either one of said two hollow members is connected to an engine, wherein
said joining portion of said one of said two hollow members is formed by the spinning working so as to project radially outward at an axially intermediate portion of said one of said two hollow members wherein
said one of said two hollow members is disposed within the other of said two hollow members, and said joining portion of said one of said two hollow members formed by the spinning working is joined to said other of said two hollow members by friction welding carried out by relatively rotating said one of said two hollow members and said other of said two hollow members, wherein
said joining portion includes an oblique surface prior to joining said two hollow members, and is joined to said other of said two hollow members by friction welding,
wherein said two hollow members are joined to form an exhaust pipe.

2. A fluid processing system comprising two hollow members joined to each other, at least one of said two hollow members having a processing function portion for subjecting fluid flowing in said at least one of said two hollow members to a predetermined processing, wherein
one of said two hollow members is formed with a joining portion by spinning working, and either one of said two hollow members is connected to an engine, wherein
said joining portion of said one of said two hollow members is formed by the spinning working so as to project radially outward at an axially intermediate portion of said one of said two hollow members, wherein
said one of said two hollow members is disposed within the other of said two hollow members, and said joining portion of said one of said two hollow members formed by the spinning working includes an oblique surface prior to joining said two hollow members, and is joined to said other of said two hollow members by friction welding,
wherein said two hollow members are joined to form an exhaust pipe.

3. A fluid processing system according to claim 2, wherein the friction welding is carried out by relatively rotating said one of said two hollow members and the other of said two hollow members.

4. A method for joining two hollow members to each other for allowing fluid to flow therethrough, comprising the steps of:
forming a joining portion on one of said two hollow members by spinning working so as to project radially outward at an axially intermediate portion of said one of said two hollow members, said joining portion including an oblique surface;
inserting said one of said two hollow members into the other of said two hollow members; and
joining said oblique surface of said joining portion of said one of said two hollow members to the other of said two hollow members by friction welding carried out by relatively rotating the one of said two hollow members and the other of said two hollow members, wherein either one of said two hollow members is connected to an engine.

5. A joining method according to claim 4, wherein
in said step for joining the two hollow members by friction welding, the joining portion is formed on said one of said two hollow members so that said one of said two hollow members is disposed radially inward of said joining portion.

6. A joining method according to claim 4, wherein said joining portion is formed by drawing said one of said two hollow members to the axially intermediate portion of said one of said two hollow members in a first axial direction with a forming roller, retreating the forming roller radially outward, and drawing said one of said two hollow members with the forming roller to the axially intermediate portion of said one of said two hollow members in a second axial direction opposite to the first axial direction.

7. A joining method according to claim 4, wherein said two hollow members are joined to form an exhaust pipe.

8. A method for joining two hollow members to each other for allowing fluid to flow therethrough, comprising the steps of:
forming a joining portion on one of two said hollow members by spinning working so as to project radially outward at an axially intermediate portion of said one of said two hollow members, said joining portion including an oblique surface;
inserting said one of said two hollow members into the other of said two hollow members; and
joining said oblique surface of said joining portion of said one of said two hollow members to the other of said two hollow members by friction welding,
wherein at least one of said two hollow members has a processing function portion for subjecting fluid flowing through the at least one of said two hollow members to a predetermined processing, and either one of said two hollow members is connected to an engine.

9. A joining method according to claim 8, wherein the friction welding is carried out by relatively rotating the one of said two hollow members and the other of said two hollow members.

10. A joining method according to claim 8, wherein said joining portion is formed by drawing said one of said two hollow members to the axially intermediate portion of said one of said two hollow members in a first axial direction with a forming roller, retreating the forming roller radially outward, and drawing said one of said two hollow members with the forming roller to the axially intermediate portion of said one of said two hollow members in a second axial direction opposite to the first axial direction.

11. A joining method according to claim 8, wherein said two hollow members are joined to form an exhaust pipe.

12. A method for joining two hollow members to each other for allowing fluid to flow therethrough, comprising the steps of:
forming a joining portion on one of said two hollow members by spinning working so as to project radially outward at an axially intermediate portion of said one of said two hollow members, said joining portion including an oblique surface;
inserting said one of said two hollow members into the other of said two hollow members; and
joining said oblique surface of said joining portion of said one of said two hollow members to said other of said two hollow members by friction welding, the joining portion being formed on said one of said two hollow members so that said one of said two hollow members is disposed radially inward of said joining portion, wherein, at least one of said two hollow members has a processing function portion for subjecting fluid flowing through the at least one of said two hollow members to a predetermined processing, and either one of said two hollow members is connected to an engine.

13. A joining method according to claim 12, wherein the friction welding is carried out by relatively rotating the one of said two hollow members and the other of said two hollow members.

14. A joining method according to claim 12, wherein said joining portion is formed by drawing said one of said two hollow members to the axially intermediate portion of said one of said two hollow members in a first axial direction with a forming roller, retreating the forming roller radially outward, and drawing said one of said two hollow members with the forming roller to the axially intermediate portion of said one of said two hollow members in a second axial direction opposite to the first axial direction.

15. A joining method according to claim 12, wherein said two hollow members are joined to form an exhaust pipe.

* * * * *

UNITED STATES PATENT AND TRADEMARK OFFICE
CERTIFICATE OF CORRECTION

PATENT NO. : 7,219,933 B2
APPLICATION NO. : 10/296038
DATED : May 22, 2007
INVENTOR(S) : Tatsuya Sakamoto et al.

It is certified that error appears in the above-identified patent and that said Letters Patent is hereby corrected as shown below:

| Column | Line | |
|---|---|---|
| 1 | 37 | Change "members" to --member--. |
| 1 | 63 | Change "members, and." to --member.--. |
| 4 | 31 | Change "member" to --members--. |
| 5 | 13 | After "inward" insert --of--. |
| 5 | 34 | Change "the-invention" to --the invention--. |
| 6 | 4 | Change "views" to --view--. |
| 6 | 39 | Change "Vehicle" to --vehicle--. |
| 6 | 52 | Change "portions lob" to --portions $10b$--. |
| 8 | 51 | Change "portion $10d$" to --portion $10c$--. |
| 8 | 52 | Change "portions lob" to --portions $10b$--. |
| 9 | 56 | Change "1.5 time" to --1.5 times--. |
| 9 | 62 | Change "portion lob" to --portions $10b$--. |
| 10 | 7 | Change "1.5 time" to --1.5 times--. |
| 10 | 25 | Change "other side ends" to --other side end--. |
| 10 | 58 | Change "only portion" to --only portions--. |
| 10 | 60 | Change "explanation" to --explanations--. |
| 11 | 7 | Change "portion $11c$" to --portion $10c$--. |
| 11 | 36 | Change "only portion" to --only portions--. |
| 11 | 38 | Change "explanation" to --explanations--. |
| 12 | 11 | Change "damper 93" to --clamper 93--. |

UNITED STATES PATENT AND TRADEMARK OFFICE
CERTIFICATE OF CORRECTION

PATENT NO. : 7,219,933 B2
APPLICATION NO. : 10/296038
DATED : May 22, 2007
INVENTOR(S) : Tatsuya Sakamoto et al.

It is certified that error appears in the above-identified patent and that said Letters Patent is hereby corrected as shown below:

| Column | Line | |
|---|---|---|
| 12 | 30 | After "possible" insert --to--. |
| 12 | 48 | Change "only portion" to --only portions--. |
| 12 | 51 | Change "explanation" to --explanations--. |
| 13 | 39 | Change "only portion" to --only portions--. |
| 13 | 42 | Change "explanation" to --explanations--. |
| 13 | 51 | Change "portion 40c" to --portions 40c--. |
| 14 | 21-22 | Change "only portion" to --only portions--. |
| 14 | 24 | Change "explanation" to --explanations--. |
| 14 | 41 | Change "the 81" to --the forming roller 81--. |
| 14 | 63 | Change "system" to --systems--. |
| 15 | 1 | Change "mixture" to --mixtures--. |
| 15 | 2 | Change "solid" to --solids--. |

Signed and Sealed this

Eleventh Day of March, 2008

JON W. DUDAS
*Director of the United States Patent and Trademark Office*